(12) United States Patent
Tanaka et al.

(10) Patent No.: US 11,898,350 B2
(45) Date of Patent: Feb. 13, 2024

(54) CEILING PANEL

(71) Applicant: Panasonic Intellectual Property Management Co., Ltd., Osaka (JP)

(72) Inventors: Koya Tanaka, Hyogo (JP); Yoshihiro Okada, Osaka (JP); Tatsuji Ono, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 343 days.

(21) Appl. No.: 17/434,380

(22) PCT Filed: Jan. 30, 2020

(86) PCT No.: PCT/JP2020/003461
§ 371 (c)(1),
(2) Date: Aug. 26, 2021

(87) PCT Pub. No.: WO2020/175000
PCT Pub. Date: Sep. 3, 2020

(65) Prior Publication Data
US 2022/0145624 A1    May 12, 2022

(30) Foreign Application Priority Data

Feb. 28, 2019    (JP) ................. 2019-035242

(51) Int. Cl.
*E04B 9/04*    (2006.01)
*B32B 3/06*    (2006.01)
(Continued)

(52) U.S. Cl.
CPC .............. *E04B 9/0435* (2013.01); *B32B 3/06* (2013.01); *B32B 5/02* (2013.01); *B32B 5/18* (2013.01);
(Continued)

(58) Field of Classification Search
CPC ........ E04B 9/0435; E04B 9/245; E04B 9/248; E04C 2/38; E04C 2002/001; E04C 2/28
See application file for complete search history.

(56) References Cited

U.S. PATENT DOCUMENTS 5,596,792 A * 1/1997 Shelton .................. E04B 9/245
24/336
7,076,928 B2 * 7/2006 Kliegle ..................... E04B 9/28
52/506.07

(Continued)

FOREIGN PATENT DOCUMENTS

CN    1285019 A    2/2001
CN    104929297 A    9/2015
(Continued)

OTHER PUBLICATIONS

Chinese Office Action with English translation of Search Report dated Nov. 24, 2022 issued in the corresponding Chinese Patent Application No. 202080016271.X.
(Continued)

*Primary Examiner* — Adriana Figueroa
(74) *Attorney, Agent, or Firm* — Rimon P.C.

(57) ABSTRACT

A ceiling panel having a connection portion at one of end portions on both sides in a first direction of a panel body in a shape of a rectangular flat plate, the connection portion connecting with a connected portion of an adjacent ceiling panel. The connection portion is fixed to the end portion by a fastener, the fastener being fastened to an insertion part inserted into a layer of the panel body from a cut portion opening on a back face of the end portion so as to penetrate a securing part provided along the back face of the end portion.

20 Claims, 11 Drawing Sheets

(51) Int. Cl.
  *B32B 5/02*   (2006.01)
  *B32B 5/18*   (2006.01)
  *E04B 9/24*   (2006.01)
  *E04C 2/28*   (2006.01)
  *E04C 2/38*   (2006.01)
  *E04C 2/00*   (2006.01)

(52) U.S. Cl.
  CPC .............. *E04B 9/245* (2013.01); *E04B 9/248* (2013.01); *E04C 2/28* (2013.01); *E04C 2/38* (2013.01); *B32B 2307/3065* (2013.01); *B32B 2419/00* (2013.01); *E04C 2002/001* (2013.01)

(56) References Cited

U.S. PATENT DOCUMENTS 10,858,831 B2 * 12/2020 Martin ...................... E04B 9/04
2003/0145547 A1   8/2003 Kliegle et al.
2011/0078970 A1 *  4/2011 Boyd .................. F16B 15/0015
                                                      52/506.07

FOREIGN PATENT DOCUMENTS

JP        S62-8261 Y2    2/1987
JP        H03-47319 U    5/1991
WO        99/28569 A1    6/1999

OTHER PUBLICATIONS

International Search Report iand Written Opinion ssued in corresponding International Patent Application No. PCT/JP2020/003461, dated Mar. 4, 2020, with partial English translation.

Chinese Office Action issued in corresponding Chinese Patent Application No. 202080016271.X, dated Jun. 2, 2022, with English translation of the Search Report.

* cited by examiner

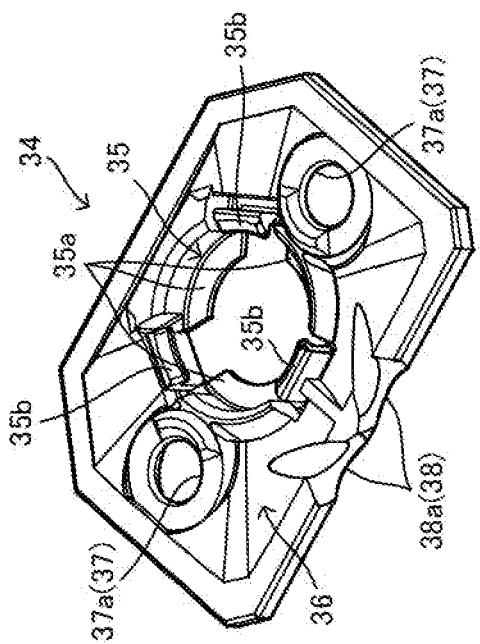
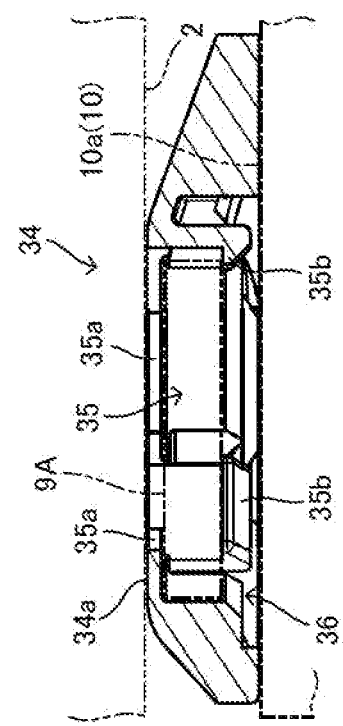
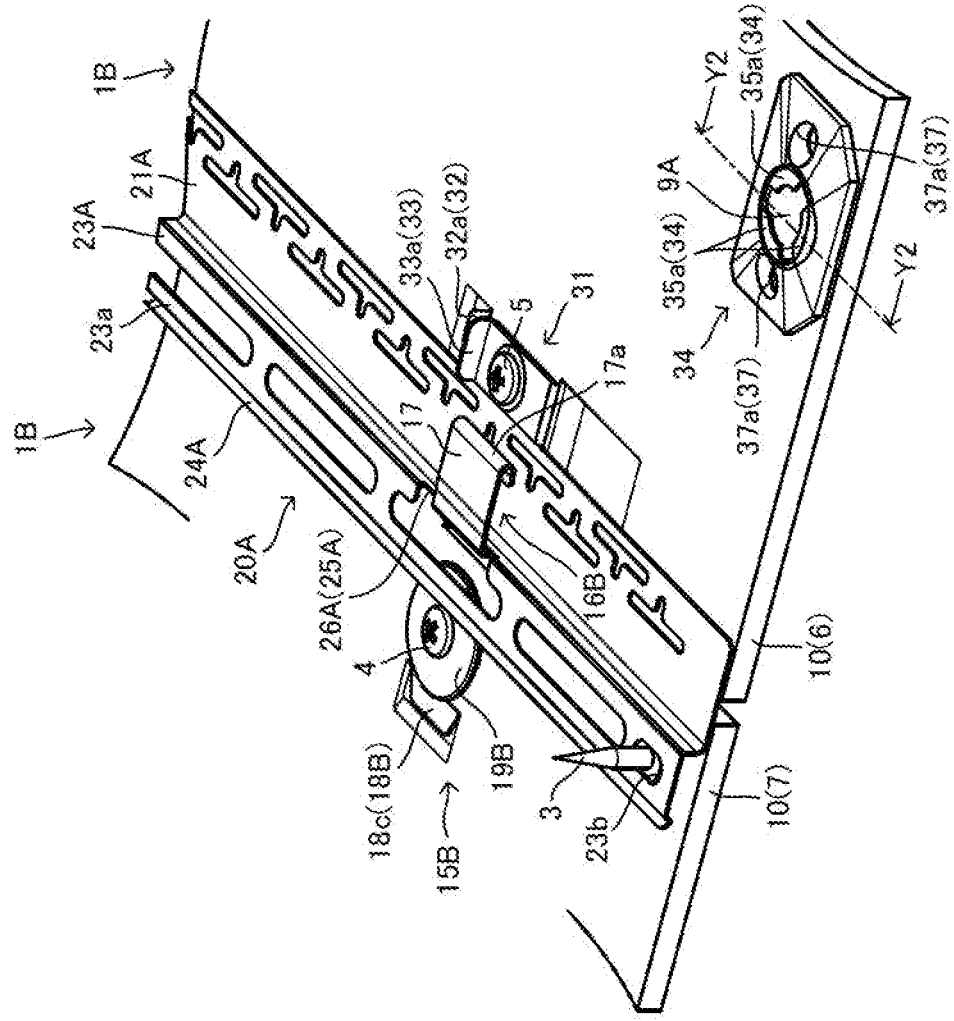
Fig. 8B
Fig. 8C
Fig. 8A

CEILING PANEL

CROSS-REFERENCE OF RELATED APPLICATIONS

This application is the U.S. National Phase under 35 U.S.C. § 371 of International Patent Application No. PCT/JP2020/003461, filed on Jan. 30, 2020, which in turn claims the benefit of Japanese Application No. 2019-035242, filed on Feb. 28, 2019, the entire disclosures of which Applications are incorporated by reference herein.

BACKGROUND OF THE INVENTION

Field of the Invention

The disclosure relates to a ceiling panel constituting a ceiling of a building.

Description of the Related Art

Conventionally known is a ceiling panel which is constructed such that the end portion is directly fixed to an ordinary ceiling base such as a ceiling joist with a screw or the like; however, a panel of resin foam system or fibrous system sometimes has difficulty in directly fixing.

For example, the following Patent Literature 1 discloses a ceiling board in which an attachment board is attached to a back face along two facing sides of an inorganic fiber board so as to protrude outward further than the two sides. The ceiling board is attached to the ceiling joist by screwing the attachment boards on both sides. The attachment board of an adjacent ceiling board is inserted and attached so as to be overlapped on the back face of the side to which the attachment board of the ceiling board thus attached is not provided.

CITATION LIST

Patent Literature

PTL 1: Japanese Examined Utility Model (Registration) Application Publication No. S62-8261

SUMMARY OF THE INVENTION

Problems to be Solved by the Invention

In the ceiling board disclosed in the above-mentioned Patent Literature 1, the attachment board is fixed to the back face of the inorganic fiber board by an adhesive, so that the attachment board is easily peeled off the ceiling board when excessive load is applied to the ceiling board and the attachment board.

The present invention is achieved in view of the above-mentioned problems and has an object to provide a ceiling panel capable of improving the securing strength of a connection member to a panel body.

Means of Solving the Problems

In order to achieve the above-mentioned object, in a ceiling panel of an embodiment of the present invention having a connection portion at one of end portions on both sides in a first direction of a panel body in a shape of a rectangular flat plate, the connection portion connecting with a connected portion of an adjacent ceiling panel, the connection portion is fixed to the end portion by a fastener, the fastener being fastened to an insertion part inserted into a layer of the panel body from a cut portion opening on a back face of the end portion so as to penetrate a securing part provided along the back face of the end portion.

In order to achieve the above-mentioned object, in a ceiling panel of an embodiment of the present invention having a connection portion at one of end portions on both sides in a first direction of a panel body in a shape of a rectangular flat plate, the connection portion connecting with a connected portion of an adjacent ceiling panel, the connection portion is provided for the connection member having the base end side part disposed so as to be along the back face of the end portion, and the connection member is fastened to the end portion by a fastener, the fastener being fastened so as to penetrate the base end side part into the insertion part inserted into the layer of the panel body from a cut portion provided so as to extend in the first direction, the cut portion being open on the back face of the end portion.

In order to achieve the above-mentioned object, in a ceiling panel of an embodiment of the present invention having a connection portion at one of end portions on both sides in a first direction of a panel body in a shape of a rectangular flat plate, the connection portion connecting with a connected portion of an adjacent ceiling panel, the connection portion is provided for the connection member having an insertion part which is inserted into the layer of the panel body from a cut portion provided so as to extend into the second direction orthogonal to the first direction, the cut portion being open on the back face of the end portion, the connection member is fixed to the end portion by a securing tool which is fastened to the insertion part so as to penetrate the securing part provided so as to be along the back face of the end portion.

Effects of the Invention

The ceiling panel according to the embodiments of the present invention is constituted as mentioned above and the securing strength of the connection member to the panel body is improved.

BRIEF DESCRIPTION OF THE DRAWINGS

FIG. 1A is a schematic plan view, and FIG. 1B is a schematic side view.

FIG. 7A is a schematic plan view, and FIG. 7B is a schematic side view.

FIG. 8A is a partially broken schematic perspective view diagrammatically illustrating the ceiling panel, FIG. 8B is a schematic perspective view diagrammatically illustrating one example of a magnet holding member provided for the ceiling panel, and FIG. 8C is a partially broken schematic longitudinal sectional view along a line shown with arrows Y2-Y2 in FIG. 8A.

DESCRIPTION OF THE EMBODIMENTS

The embodiments of the present invention are explained based on the drawings. In some drawings, some detailed reference signs allotted in other drawings are omitted. In the following embodiments, directions such as the vertical direction are explained under such a standard condition that a ceiling panel in each embodiment is constructed or to be constructed.

FIG. 1 to FIG. 6 diagrammatically illustrate one example of the ceiling panel and one example of construction procedures of the ceiling panel in the first embodiment.

Figure 1A:
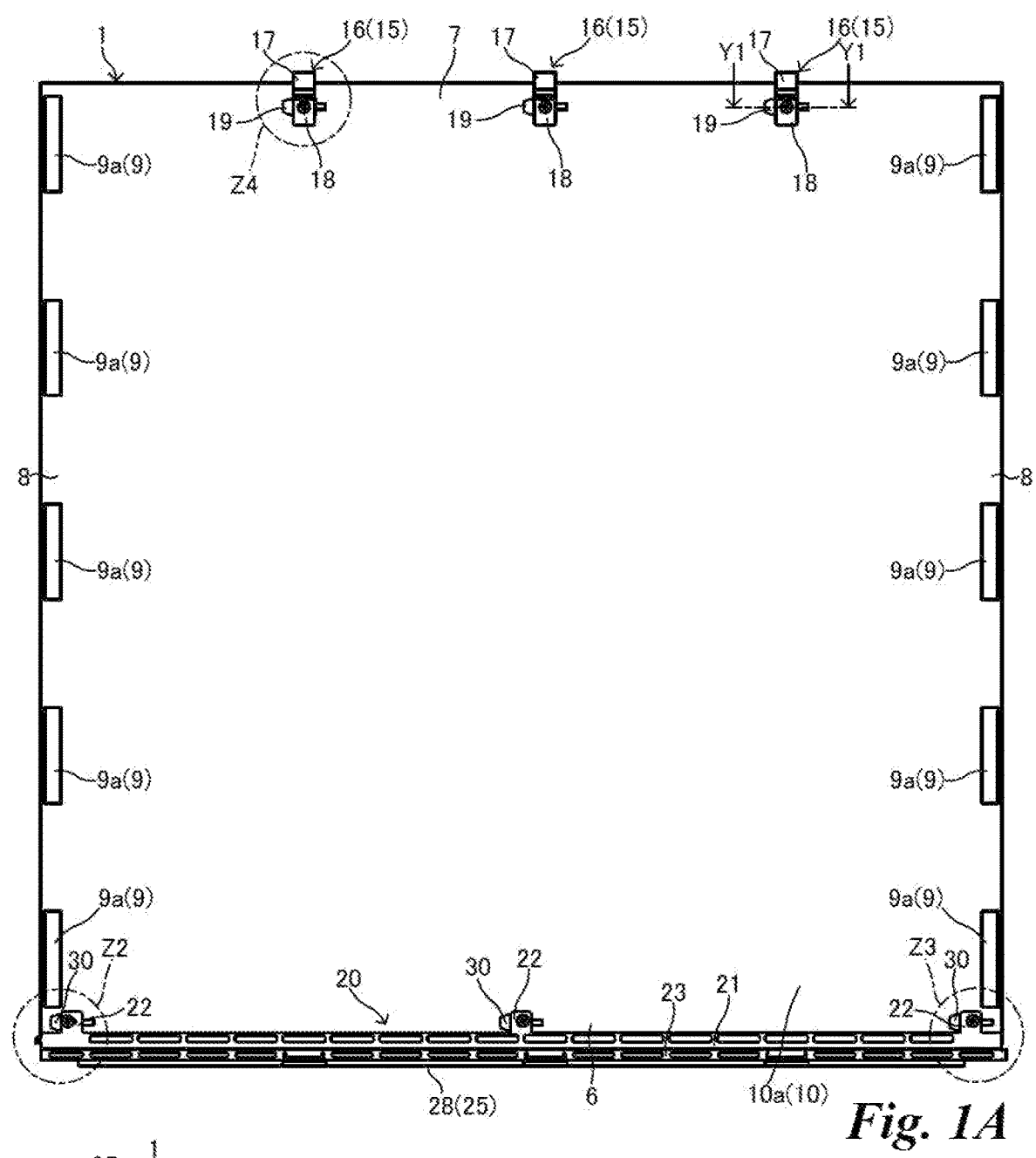
FIG. 1A and FIG. 1B diagrammatically illustrate an example of a ceiling panel according to one embodiment of the present invention.
Figure 1B:
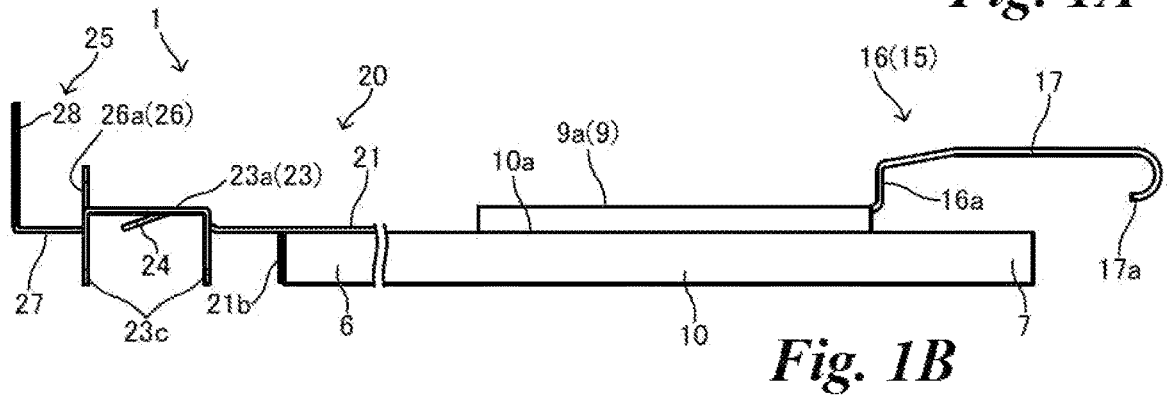
Figure 2A:
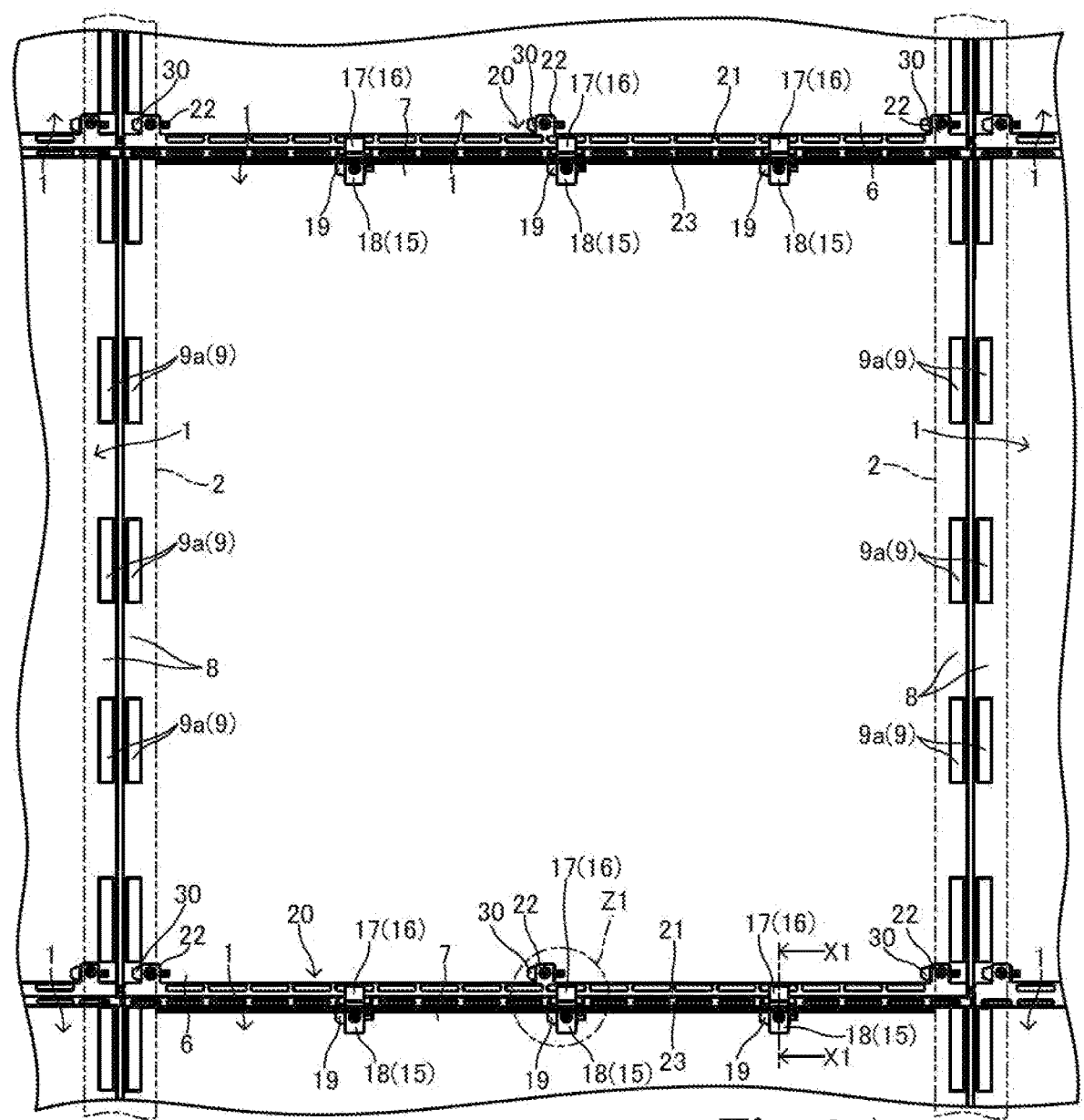
FIG. 2A is a partially broken schematic plan view diagrammatically illustrating that the ceiling panel is constructed.
Figure 2B:
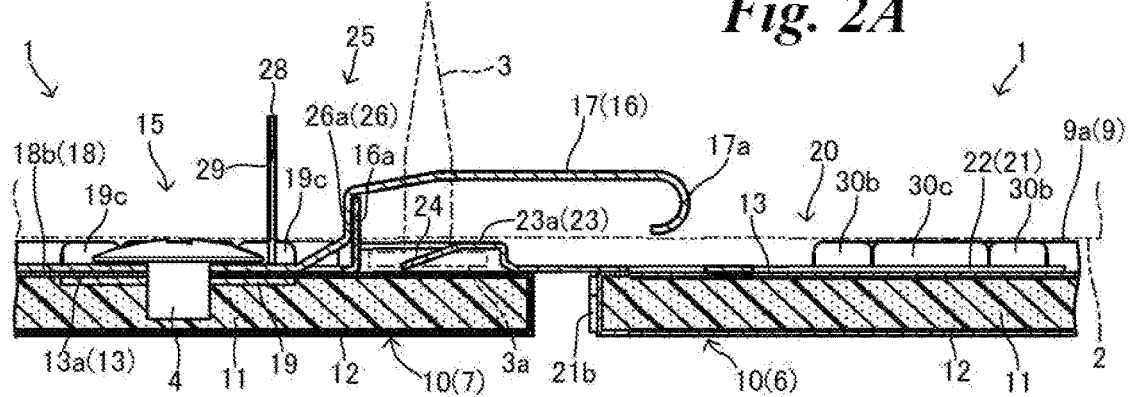
FIG. 2B is a partially broken schematic longitudinal sectional view along a line shown with arrows X1-X1 in FIG. 2A.

A ceiling panel 1 in the embodiment has a panel body 10 in the shape of a rectangular flat plate as illustrated in FIG. 1A and FIG. 1B. The ceiling panel 1 is fixed to ceiling bases 2, 2 that have a long shape extending in the first direction and are arranged in parallel with a space in the second direction orthogonal to the first direction as illustrated in FIG. 2A and FIG. 2B. Held end portions 8, 8, i.e., end portions to be held, of the ceiling panel 1 at both end portions in the second direction are held to the ceiling bases 2, 2.

The ceiling base 2 to which the ceiling panel 1 is fixed can be a wood ceiling base, but it is a steel ceiling base made of ferromagnetic material in this embodiment. Such a ceiling base 2 can be made of a light steel material and can constitute a light ceiling base. The ceiling base 2 can be a ceiling joist constituting a suspended ceiling that is suspended by a suspension member such as a hanger or a hanging bolt through a ceiling joist receiver in the shape of a grooved steel, or in the shape of a channel, and can be constituted in several manners. A plurality of ceiling bases 2 are arranged in parallel with an approximately equal space, or at an approximately equal pitch, in the second direction orthogonal to the vertical direction and the first direction and constitute a ceiling base structure.

The ceiling panel 1 can be constructed as a ceiling of a relatively small-scale building such as a house or an office, or can be constructed as a ceiling in a relatively large-scale building such as a gymnasium, a hall, a shopping mall, a factory, or a school.

The ceiling panel 1 can be a panel of which mass per a unit area (1 $m^2$) is equal to or less than 2.0 kg. Or the mass of the ceiling panel 1 can be set in such a manner that the mass of the entire ceiling system including the ceiling base 2 constituted with the above-mentioned light ceiling base is equal to or less than 2.0 $kg/m^2$.

The panel body 10 is approximately rectangular on a plan view, or seen in the thickness direction. The panel body 10 is approximately square on a plan view in this embodiment, but it can be approximately oblong. The size of the panel body 10 on a plan view can be suitably set in view of operability, workability and the like, and, for example, one side of the panel body 10 can be equal to or larger than 0.3 m in length or can be equal to or less than 2.0 m in length. In the approximately square panel body 10, one side can be equal to or larger than 0.4 m in length or equal to or less than 1.5 m in length, or can be from 0.9 m to 1.2 m in length. In the approximately oblong panel body 10, the short side can be equal to or larger than 0.3 m in length and the long side can be equal to or less than 2.0 m in length. The thickness of the panel body 10 can be, for example, 3.0 mm to 15.0 mm depending on a layer structure.

The panel body 10 can be a gypsum plaster board, a calcium silicate board, or the like. In this embodiment, the panel body 10 includes a base member 11 of resin foam system or of fibrous system as illustrated in FIG. 2B. An example of the base member 11 of resin form system is formed by a resin compound such as a polyurethane resin, a polystyrene resin, a polyethylene resin, a polypropylene resin, a phenolic resin, or an epoxy resin. An example of the base member 11 of fibrous system is formed by a mineral fiber such as a glass wool or a rock wool. In the figures, the base member 11 is a resin foam layer. The base member 11 can be greater part of the panel body 10, and the thickness of the base member 11 can be around 80% to 99% of the thickness of the panel body 10.

The panel body 10 has a surface layer 12 on one side, being on a room side, of the base member 11 in the thickness direction. The surface layer 12 can include a fire-retardant layer.

The above-mentioned fire-retardant layer can be suitably constituted in such a manner that the ceiling panel 1 satisfies the technical standard of performance required for a noncombustible material or the like stipulated by the Building Standard Law. For example, the ceiling panel 1 can be constituted so as to satisfy the standard of "fire-retardant material" in the technical standard, can preferably be constituted so as to satisfy the standard of "semi noncombustible material", or can more preferably be constituted so as to satisfy the standard of "noncombustible material". The fire-retardant layer can be an aluminum sheet in the shape of a thin sheet such as a foil-like sheet.

The surface layer 12 can be provided with a reinforcement layer including a reinforced fiber such as a glass fiber. The reinforcement layer can be a reinforced fiber sheet such as a glass cloth, or can be a fiber reinforced resin layer such as a glass fiber reinforced resin layer in which resin is impregnated into a reinforced fiber sheet. A downward or room-side face of the surface layer 12, i.e., a face on the inside of a room, can be a decorative surface provided with a suitable surface decorative treatment such as adhesion of a decorative sheet, printing, or painting, or can be a base face to be stuck with a suitable decorative sheet.

The panel body 10 is constituted by laminating a reinforcement layer 13 on the back face side, or on the side of the ceiling base, of the base member 11. Such a constitution achieves weight reduction by the base member 11 mentioned above and also restrains sagging by the reinforcement member 13 on the back face side. The reinforcement layer 13 can be a reinforced fiber sheet such as a glass cloth, or can be a fiber reinforced resin layer such as a glass fiber reinforced resin layer in which resin is impregnated into a reinforced fiber sheet, as mentioned above.

The panel body 10 is constituted such that an end face layer is provided on side end faces of four peripheries of the base member 11. The end face layer can be constituted in the same manner as the surface layer 12. The end face layer can be successively formed from the surface layer 12 or can be separately formed in the shape of an edge sheet.

Magnets 9, 9 to be attracted to an attracted portion, i.e., a portion to be attracted, of the ceiling bases 2, 2 are provided on a back face 10a side of the held end portions 8, 8 provided for the panel body 10 on both sides in the second direction as illustrated in FIG. 1A. A hooked portion 25, i.e., a portion to be hooked, constituting a connected portion, i.e., a portion to be connected, is provided on the back face 10a side of a first end portion 6 of the panel body 10 in the first direction. A second end portion 7, one of end portions 6, 7 of the panel body 10 in the first direction, has a hooking portion 16 constituting a connection portion to hook on the hooked portion 25 of an adjacent ceiling panel 1 to be provided in the first direction. In such a constitution, the hooking portion 16 of the second end portion 7 is hooked on the hooked portion 25 of the adjacent ceiling panel 1 to be provided in the first direction, the magnets 9, 9 of the held end portions 8, 8 on both sides in the second direction are attracted to an attracted portion, i.e., a portion to be attached, of the ceiling bases 2, 2, and the ceiling panel 1 is attached or temporarily fixed. Thus, the ceiling panel 1 is easily constructed, the number of working people is reduced, and the construction is easily executed only by one person.

The magnet 9 is provided so as to extend in the first direction along the held end portion 8 as illustrated in FIG. 1A. The magnet 9 is provided in such a manner that the ceiling panel 1 is held or temporarily held by attraction to the ceiling bases 2, 2 on both sides in the second direction. In the embodiment, a plurality of magnets 9 (five in the figures) are provided for the held end portion 8 with a space in the first direction. The figures exemplify that a plurality of magnets 9 are provided at approximately equal intervals in the first direction. The magnets 9, 9 are also provided in the vicinity of the first end portion 6 and in the vicinity of the second end portion 7, respectively. In place of such a constitution, the magnet 9 can be provided along the held end portion 8 in the first direction almost entirely. The dimension in length of the magnet 9 along the first direction and the dimension in width of the magnet 9 along the second direction can be suitably set in view of retention performance or temporal retention performance, restraint of sagging, and weight reduction of the ceiling panel 1.

The magnet 9 is in the shape of a plate of which thickness direction is along the thickness direction of the panel body 10, referring also to FIG. 1B. The thickness dimension of the magnet 9 can be about 1 mm to 5 mm. In the embodiment, the magnet 9 is provided in a piled-up manner on the back face 10a of the panel body 10. The magnet 9 can be fixed to the panel body 10 with suitable glue, adhesive or the like. The attracted portion of the ceiling base 2 which is attracted by the magnetic force of the magnet 9 is the entire of the lower face, i.e., the face on the inside of a room, of the ceiling base 2 when the ceiling base 2 is made of a ferromagnetic material as mentioned above. In place of such a constitution, a suitable magnet in the shape of a sheet, a ferromagnetic material in the shape of a sheet, or the like can be provided as the attracted portion in an attached manner or in an embedded manner on the lower side of the ceiling base 2 made of a non-magnetic material.

The hooking portion 16 has a folded part 17a which is bent toward the inside of a room from a tip end portion in the extending direction of the extension portion 17 extending outward in the first direction from the second end portion 7 of the panel body 10 and which is further folded inward in the first direction as illustrated in FIG. 1A and FIG. 1B. The hooked portion 25 is constituted so as to be hooked and held by the folded part 17a of the ceiling panel 1 with the second end portion 7 of the adjacent ceiling panel 1 to be provided in the first direction being positioned upward further than the first end portion 6 as illustrated in FIG. 5 and FIG. 6. In such a constitution, the folded part 17a of an unconstructed ceiling panel 1 is hooked from below relative to the hooked portion 25 of the constructed ceiling panel 1 with the second end portion 7 side kept upward, and the ceiling panel 1 is held. Thus, compared with a constitution which requires to horizontally move the ceiling panel while keeping a horizontal condition at a high place, the workability is improved in the embodiment. In addition, the first end portion 6 side is raised so as to turn the ceiling panel 1 around the second end portion 7 side as a fulcrum after the condition such that the second end portion 7 side is held, thereby fixing to the ceiling base 2. In the embodiment, the magnets 9, 9 are provided for the held end portions 8, 8 as mentioned above, so that the ceiling panel 1 is easily held or temporarily held relative to the ceiling bases 2, 2 by the magnets 9, 9 of the held end portions 8, 8 when the first end portion 6 side is raised after the second end portion 7 side is held.

An abutting face 16a is provided on the base end side of the hooking portion 16 so as to face the folded part 17a, the abutting face 16a abutting on an abutted face 26a, i.e., a face to be abutted, provided for the hooked portion 25 of the adjacent ceiling panel 1 to be provided in the first direction. The abutting face 16a restricts movement of the ceiling panels 1, 1 adjacent to each other toward a close side in the first direction because the abutting face 16a abuts on the abutted face 26a. In such a constitution, when the unconstructed ceiling panel 1 is moved relative to the constructed ceiling panel 1 and the abutting face 16a abuts on the abutted face 26a while being held on the constructed ceiling panel 1 as mentioned above, the ceiling panels 1, 1 are easily positioned relative to each other. As illustrated in FIG. 2B, when a gap-like joint is provided between the end faces, facing in the first direction, of the ceiling panels 1, 1 adjacent to each other in the first direction, the gap between the ceiling panels 1, 1 is easily made equal. The gap between the ceiling panels 1, 1 adjacent to each other in the first direction can be about 1 mm to 15 mm.

Figure 4A:
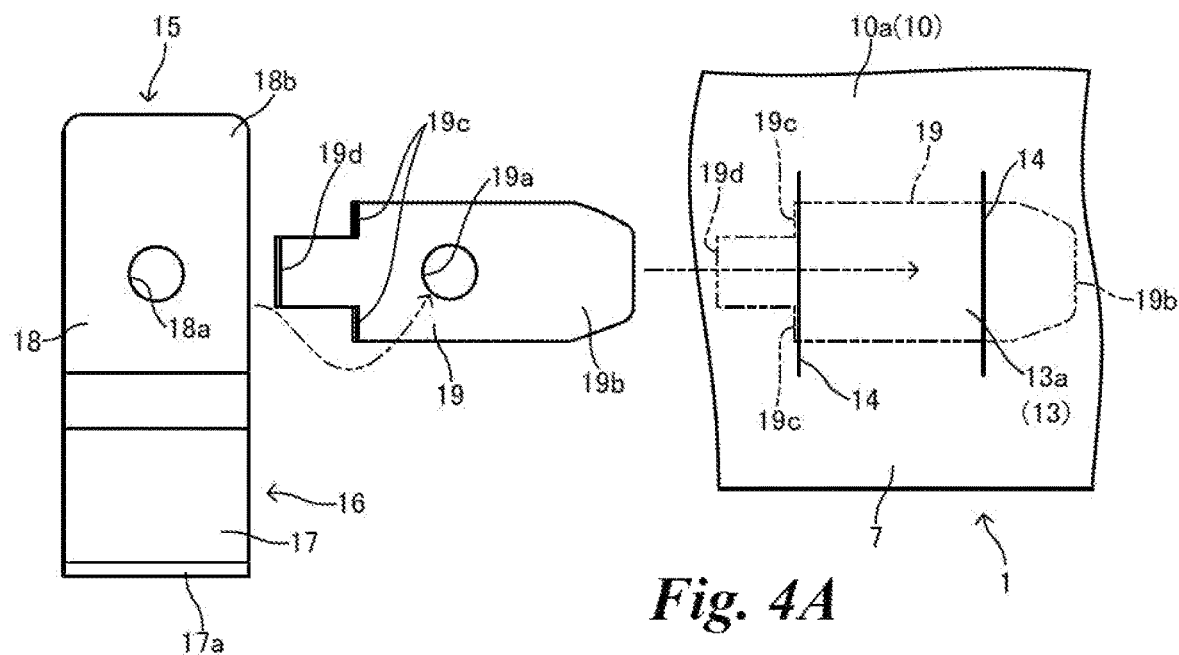
FIG. 4A is a partially broken schematic exploded plan view corresponding to Z4 in FIG. 1A.
Figure 4B:
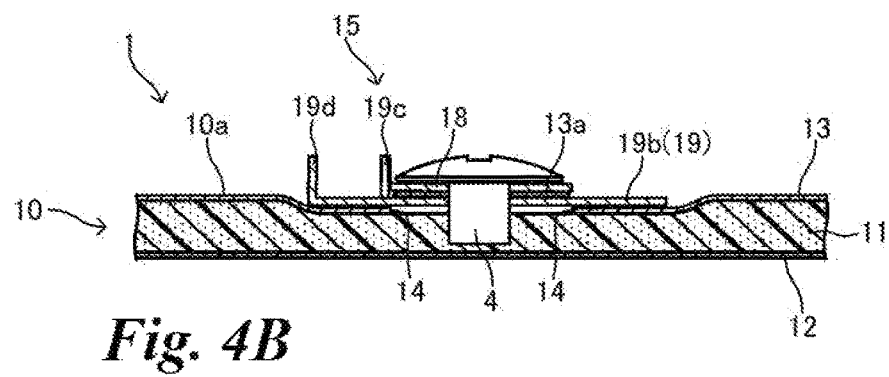
FIG. 4B is a partially broken schematic longitudinal sectional view along a line shown with arrows Y1-Y1 in FIG. 1A, and FIG. 4C diagrammatically illustrates a variation of a connection member provided for the ceiling panel and is a partially broken diagrammatic longitudinal sectional view corresponding to FIG. 4B.

The hooking portion 16 is fixed to the second end portion 7 by a fastener 4 that is fastened to an insertion part 19 inserted into a layer of the panel body 10 from a cut portion 14 opening on the back face 10a of the second end portion 7 so as to penetrate a base end side part 18 constituting a securing part. The base end side part 18 is arranged along the back face 10a of the second end portion 7 and is provided for a connection member 15 having the hooking portion 16 in the embodiment as illustrated in FIG. 4A and FIG. 4B. Such a constitution makes the connection member 15 inconspicuous from the surface side. In addition, the connection member 15 is mechanically fixed to the second end portion 7 by the fastener 4 fastened to the insertion portion 19 with a back face side layer, or a clamped layer 13a, i.e., a layer to be clamped, of the panel body 10 held between the insertion part 19 and the base end side part 18. Compared with a constitution in which the base end side part 18 is fixed to the second end portion 7 by an adhesive or the fastener 4 fastened only to the panel body 10, the securing strength of the connection member 15 to the second end portion 7 is improved under the constitution in which the connection member 15 is provided on the back face side. In addition, in the embodiment, the cut portion 14 is provided so as to extend in the first direction. In such a constitution, the load applied to the back face side layer around the cut portion 14 is reduced when the load along the direction of the panel thickness is applied to the hooking portion 16 by the own weight of the ceiling panel 1 or the weight of the adjacent ceiling panel 1 to be provided, compared with a constitution in which the insertion part 19 is inserted into the cut portion extending in the second direction.

In the embodiment, the cut portion 14 is constituted so as to penetrate the reinforcement layer 13 on the back face 10a side of the panel body 10. In such a constitution, the insertion part 19 is arranged so as to be embedded into an inner layer side further than the reinforcement layer 13. The clamped layer 13a including at least the reinforcement layer 13 is held between the insertion part 19 and the base end side part 18, thereby effectively improving the securing strength of the connection member 15 to the second end portion 7. The securing strength of the connection member 15 is improved compared with such a constitution that only a resin foam layer or a mineral fiber layer constitutes the clamped layer without providing the reinforcement layer 13.

In the embodiment, the cut portions 14, 14 are provided at two positions in parallel with a space in the second direction. The insertion part 19 is inserted into one of the cut portions 14, 14, a tip end portion 19b in the insertion direction is exposed on the back face 10a side of the panel body 10 through the other cut portion 14. In such a constitution, the weight applied when the above-mentioned load is applied to the hooking portion 16 is dispersed into the back face side layer around two cut portions 14, 14 to be loaded, compared with such a constitution that the insertion part 19 is inserted into one cut portion 14. Therefore, the securing strength of the connection member 15 to the second end portion 7 is effectively improved.

In the embodiment, the base end side part 18 has an extension portion 18b extending inward in the first direction, or on the side of the first end portion 6, further than the insertion part 19. In such a constitution, the weight which makes the hooking portion 16 turn into the ceiling base 2 side relative to the panel body 10 by being applied with the above-mentioned load is received by the extension portion 18b provided along the back face 10a of the panel body 10. Thus, the securing strength of the connection member 15 to the second end portion 7 is effectively improved.

In the embodiment, the insertion part 19 is separately provided from the base end side part 18. In such a constitution, the clamped layer 13a is restrained from being hooked or twisted when the insertion part 19 is inserted, compared with such a constitution that the insertion part 19 is integrally provided with the base end side part 18.

The base end side part 18 is in the shape of a plate of which thickness direction is along the thickness direction of the panel body 10. The figures exemplify that the base end side part 18 is roughly in the shape of a rectangle seen in the thickness direction. In the exemplification, both corner portions of the inside end portions in the first direction of the base end side part 18, i.e., the extension portion 18b in the embodiment, are in the shape of a protruding curve seen in the thickness direction.

The base end side part 18 is provided with an insertion through hole 18a into which a shaft portion of the fastener 4 is inserted.

The dimension of the base end side part 18 along the first direction is larger than that of the insertion part 19 along the first direction so as to form the extension portion 18b inside in the first direction. The extension portion 18b is successively provided from the inside region of the base end side part 18 in the first direction. The thickness dimension of the base end side part 18 can be suitably set in view of strength, weight reduction, or the like, and for example, can be about 0.3 mm to 3 mm.

The hooking portion 16 is successively provided for the outer end portion of the base end side part 18 in the first direction. The base end portion of the hooking portion 16 has a raised part provided so as to rise upward, or toward the side of the ceiling base 2, from the outer end portion of the base end side part 18 in the first direction, and a face of the raised part on the outside in the first direction constitutes the abutting face 16a as illustrated in FIG. 1B and FIG. 2B. In the figures, the raised part is provided through an inclined part extending obliquely upward from the outer end portion of the base end side part 18 in the first direction. The extension portion 17 is provided so as to extend outward in the first direction from the upper end portion of the raised part. The protruding dimension of the extension portion 17 along the first direction from the end face of the second end portion 7 of the panel body 10 can be suitably set so as to easily hook on the hooked portion 25 of the constructed ceiling panel 1 from below or in view of achieving weight reduction.

The extension portion 17 is in the shape of a hook and has the folded part 17a on the tip end portion. The tip end of the folded part 17a is provided so as to be directed inward in the first direction. The figures exemplify that the tip end of the folded part 17a is positioned at the same height as the raised part constituting the abutting face 16a. In the figures, the folded part 17a is approximately in the shape of a half circular arc, or in the shape like a letter C, seen in the second direction; however, the folded part 17a can be approximately in the shape of a letter V having a single flexed portion or can have a plurality of flexed portions. The dimension of the folded regions of the folded part 17a along the first direction can be suitably set so as to easily hook on the hooked portion 25 of the constructed ceiling panel 1 from below or in view of achieving weight reduction.

The inclined part, the raised part, the extension portion 17, and the folded part 17a of the hooking portion 16 can be the same as the base end side part 18 in thickness and can be suitably formed successively by a press working or a bending procedure. The width dimension of the hooking portion 16 along the second direction is the same as the width dimension of the base end side part 18 along the second direction.

The insertion part 19 is roughly in the shape of a plate of which thickness direction is along the thickness direction of the panel body 10 as illustrated in FIG. 4A and FIG. 4B. The figures exemplify that the insertion part 19 is roughly in the shape of a rectangle seen in the thickness direction. The tip end portion 19b in the insertion direction of the insertion part 19 is gradually tapered toward the tip end side seen in the thickness direction. In such a constitution, the insertion part 19 is easily inserted into the layer of the panel body 10 through the cut portion 14. Both corner portions of the tip end portion 19b in the insertion direction are in the shape of a protruding curve seen in the thickness direction.

The insertion part 19 is provided with a fastening hole 19a to which the shaft portion of the fastener 4 is fastened. The fastening hole 19a can be a female hole with which the shaft portion of the fastener 4 is screwed or can be a base hole into which the shaft portion of the fastener 4 is screwed. The thickness dimension of the insertion part 19 can be suitably set in view of strength, weight reduction, or the like, and, for example, can be 0.5 mm to 3 mm.

In the embodiment, the base end portion in the insertion direction of the insertion part 19 has raised parts 19c, 19d rising upward, or toward the side of the ceiling base 2. In the figures, the raised parts 19c, 19c which are abutted on one side portion of the base end side part 18 are separated on both ends in the first direction, and the raised part 19d rising from the extension portion extending in the reverse insertion direction is provided between the raised parts 19c, 19c. In such a constitution, the insertion part 19 is easily inserted into the layer of the panel body 10 through the cut portion 14 with the raised part 19d being grasped.

The raised parts 19c, 19c on both sides are constituted such that the dimension along the insertion direction from the raised parts 19c, 19c to the center of the fastening hole 19a is approximately the same as the dimension along the same direction from one side portion of the base end side part 18 along the same direction to the center of the insertion through hole 18a. In such a constitution, when one side portion of the base end side part 18 is abutted on the raised parts 19c, 19c and the base end side part 18 is piled on the insertion part 19, the centers of the fastening hole 19a and the insertion through hole 18a coincide in the second direction, thereby achieving easy positioning.

The raised parts 19c, 19c, 19d are successively provided at the base end portion in the insertion direction of the insertion part 19. The rising dimension of the raised parts 19c, 19c, 19d along the thickness direction of the panel can be suitably set so as not to interfere with the base which is sometimes provided in the middle region of the ceiling panel 1 in the second direction for attaching facility equipment or the like and for reinforcement. The figures exemplify that the tip end portions of the raised parts 19c, 19c, 19d in the rising direction are approximately the same in height as an abutting face 9a to be abutted on the magnet 9 of the ceiling base 2.

The dimension of the insertion part 19 from the raised part 19c along the insertion direction, or in the second direction, is larger than the dimension of the base end side part 18 along the second direction in such a manner that the tip end portion 19b in the insertion direction is exposed on the back face 10a side of the panel body 10. The dimension along the second direction between two cut portions 14, 14 provided for the panel body 10 is smaller than the dimension of the insertion part 19 along the second direction. The dimension of the cut portions 14, 14 along the first direction is larger than the dimension of the insertion part 19 along the first direction. The dimension of the cut portions 14, 14 along the first direction can be slightly larger than the dimension of the insertion part 19 along the first direction. The insertion part 19 can be successively produced by a suitable press working, a bending procedure or the like. The hooking portion 16 including the insertion part 19 and the base end side part 18 can be made of a suitable metal material.

The connection member 15 constituted as mentioned above can be fixed to the second end portion 7 of the panel body 10 to be mentioned below.

The insertion part 19 is inserted into the layer of the panel body 10 through one of the cut portions 14, 14 formed at the second end portion 7 of the panel body 10. The cut portions 14, 14 can be formed using a suitable cutter or the like so as to penetrate at least the reinforcement layer 13. The tip end portion 19b in the insertion direction of the insertion part 19 is exposed on the back face 10a side of the panel body 10 through the other cut portion 14, and the insertion part 19 is attached to the second end portion 7 of the panel body 10. In such a case, the insertion part 19 can be attached such that the base member 11 of the panel body 10 is deformed by compression, referring to FIG. 4B. In such a condition, the clamped layer 13a including the reinforcement layer 13 between the cut portions 14, 14 is provided on the upper side of the insertion part 19. The clamped layer 13a can include a part of the base member 11.

The base end side part 18 is piled on the clamped layer 13a so as to coincide the insertion through hole 18a with the fastening hole 19a of the insertion part 19, and the position of the insertion part 19 and the base end side part 18 is adjusted in such a manner that the protruding dimension of the hooking portion 16 outward in the first direction becomes a predetermined dimension. Then, the fastener 4 is fastened to the fastening hole 19a of the insertion part 19 through the insertion through hole 18a of the base end side part 18. Thus, the shaft portion of the fastener 4 penetrates the clamped layer 13a held between the base end side part 18 and the insertion part 19, and the insertion part 19 and the base end side part 18 are fixed to the second end portion 7. The figures exemplify that the shaft portion of the fastener 4 is provided so as to exceed the center of the base member 11 in the thickness direction; however, the embodiment is not limited to such an exemplification. The insertion part 19 is not limited to the exemplification mentioned above, and one or both of the raised parts 19c, 19c, 19d and the tip end portion 19b in the insertion direction which is exposed on the back face 10a are not always required. The base end side part 18 is not limited to the exemplification mentioned above, and the extension portion 18b as mentioned above is not always required.

In the embodiment, as illustrated in FIG. 1A, a plurality of connection members 15, 15, 15 (three in the figures) are provided for the second end portion 7 spaced in the second direction. The connection members 15, 15, 15 are similarly constituted. The connection members 15, 15, 15 are respectively spaced at approximately equal intervals. The figures exemplify that the dimension along the second direction from each end face of the held end portions 8, 8 on both sides in the second direction to the connection members 15, 15 on the outermost side in the second direction is almost the same as the dimension between the connection members 15, 15 adjacent to each other. The connection members 15, 15, 15 are not always required to be provided for the second end portion 7 close to the wall of the ceiling panel 1 provided close to the wall.

Figure 4C:
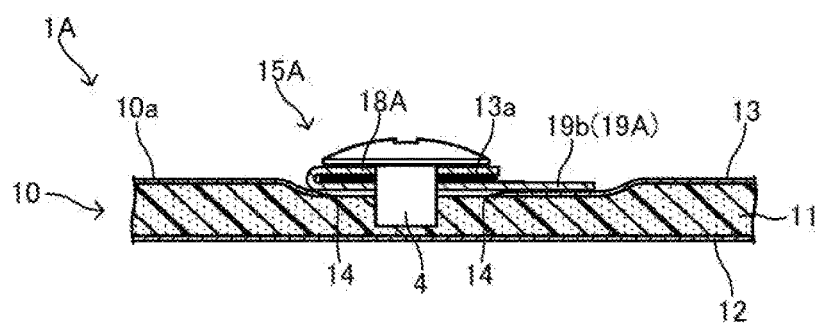

In place of the connection member 15 as mentioned above, the connection member 15 can be a connection member 15A provided for a ceiling panel 1A of a variation illustrated in FIG. 4C. In the following variation, the difference with the above-mentioned embodiment is mainly explained, the similar members have the same reference numerals, and explanation of such reference numerals is omitted or simplified. The effects and the attachment procedures which are the same as those of the above-mentioned embodiment are not explained or are simply explained.

The connection member 15A in the variation is constituted such that an insertion part 19A is bent from one side portion of a base end side part 18A in the second direction and is integrally provided with the connection member 15A. Such a constitution improves operability compared with the above-mentioned constitution in which the insertion part 19 is separately provided from the connection member 15, i.e., the base end side part 18. When the fastening hole 19a and the insertion through hole 18a are provided for the insertion part 19A and the base end side part 18A, positioning thereof is not required, thereby improving attachment performance.

The insertion part 19A is successively provided for one side portion of the base end side part 18A in the second direction. The dimension of the gap between the base end side part 18A and the insertion part 19A along the thickness direction is suitably set so as to facilitate reception of the clamed layer 13a. A suitable inclined guide face or the like can be provided for the other end of the base end side part 18A in the second direction so as to facilitate reception of the held layer 13a.

The first end portion 6 side of the ceiling panel 1 provided with the above-mentioned connection member 15 and the construction procedures are explained as below and are the same as the first end portion 6 side of the ceiling panel 1A provided with the connection member 15A and the construction procedures in the variation.

Like a reinforcement member 20 to be mentioned later, the connection members 15, 15A can be provided along the first direction of the second end portion 7 almost entirely. Namely, the hooking portion 16 can be provided for the reinforcement member provided along the first direction of the second end portion 7 almost entirely. The connection members 15, 15A and the hooking portion 16 provided for the second end portion 7 of the panel body 10 can be variously modified.

A securing part 23 which protrudes outward in the first direction from the first end portion 6 and is fixed to the ceiling base 2 is provided on the back face 10a side of the first end portion 6 of the panel body 10 as illustrated in FIG. 2B. In such a constitution, the fastener 3 is fastened toward the ceiling base 2 from inside of the room, or from below, through the securing part 23 protruding outward in the first direction from the first end portion 6, and the ceiling panel 1 is fixed to the ceiling base 2, referring to FIG. 5B. The hooking portion 16 of the second end portion 7 of the adjacent ceiling panel 1 to be provided in the first direction hooks on the hooked portion 25 of the first end portion 6 of the ceiling panel 1 fixed to the ceiling base 2 through the securing part 23. The securing part 23 is constituted to protrude outward in the first direction from the back face 10a side of the panel body 10, so that the securing part 23 is inconspicuous from the surface side because of the ceiling panel 1 when the adjacent ceiling panel 1 to be provided in the first direction is connected.

In the embodiment, an abutting face 23a, abutting on the ceiling base 2, of the securing part 23 and an abutting face 9a, abutting on the ceiling base 2, of the magnet 9 are on the same plane. In such a constitution, the abutting faces 9a, 23a are stably abutted on the ceiling base 2 while reducing such a requirement that the magnet 9 is provided in an embedded manner. The constitution such that the abutting face 23a of the securing part 23 and the abutting face 9a of the magnet 9 are on the same plane is not limited to a constitution in which they are completely on the same plane, and includes such a constitution that there is a difference of about 2 mm in the thickness direction of the panel.

The securing part 23 is provided so as to have a gap between the securing part 23 and the back face 10a of the ceiling panel 1 which is provided downward the securing part 23 and is adjacent in the first direction, the gap having the dimension larger than the dimension of a head portion 3a of the fastener 3 along the axial direction, the fastener 3 fixing the securing part 23 to the ceiling base 2. Such a constitution restrains the interference of the back face 10a of the adjacent ceiling panel 1 to be provided in the first direction and the head portion 3a of the fastener 3 fixing the securing part 23 to the ceiling base 2 and restrains occurrence of the level difference between the surfaces of the ceiling panels 1, 1 adjacent to each other in the first direction.

In the embodiment, as illustrated in FIG. 1, the securing part 23 and the hooked portion 25 are provided for the reinforcement member 20 fixed almost entirely along the second direction so as to be along the back face 10a of the first end portion 6 of the panel body 10. In such a constitution, in the same manner as mentioned above, the reinforcement member 20 is inconspicuous from the surface side, and the strength of the first end portion 6 of the ceiling panel 1 is improved by the reinforcement member 20, thereby restraining sagging and the like. In addition, the securing part 23 is stably fixed to the ceiling base 2, and the retaining strength of the second end portion 7 of the adjacent ceiling panel 1 to be provided in the first direction is improved, the second end portion 7 hooking on the hooked portion 25 of the reinforcement member 20 fixed as mentioned above. The constitution reduces such a requirement that the ceiling base is provided in the second direction at a relatively small pitch and restrains sagging of the center region of the ceiling panel 1 in the second direction under such a constitution that a joiner and the like are not exposed on the surface side. Namely, while reducing the weight of the entire ceiling system including the ceiling base 2, the retaining strength of the ceiling panel 1 is improved and the appearance on the surface side is improved by inhibiting sagging.

The reinforcement member 20 is long in the second direction of the panel body 10, and has a base portion 21 disposed along the back face 10a of the first end portion 6 and an attachment portion 22 provided for the base portion 21 to attach the reinforcement member 20 to the panel body 10.

The base portion 21 is provided along the panel body 10 in the second direction almost entirely and is in the shape of a plate of which thickness direction is along the thickness direction of the panel body 10. In the embodiment, the base portion 21 is provided entirely along the second direction of the panel body 10. The reinforcement member 20 to be provided in the second direction of the panel body 10 almost entirely can be equal to or more than seven-tenths of the panel body 10 along the second direction in length.

The width along the first direction and the thickness of the base portion 21 can be suitably set in view of strength and weight reduction. The figures exemplify that the base portion 21 is provided with a plurality of long holes of which diameters are long in the second direction, the long holes being spaced in the second direction. A region protruding from the end face of the first end portion 6 outward in the first direction further than the region where the long holes of the base portion 21 are provided is arranged to define the bottom side of the gap formed between the ceiling panels 1, 1 adjacent to each other in the first direction.

Figure 3A:
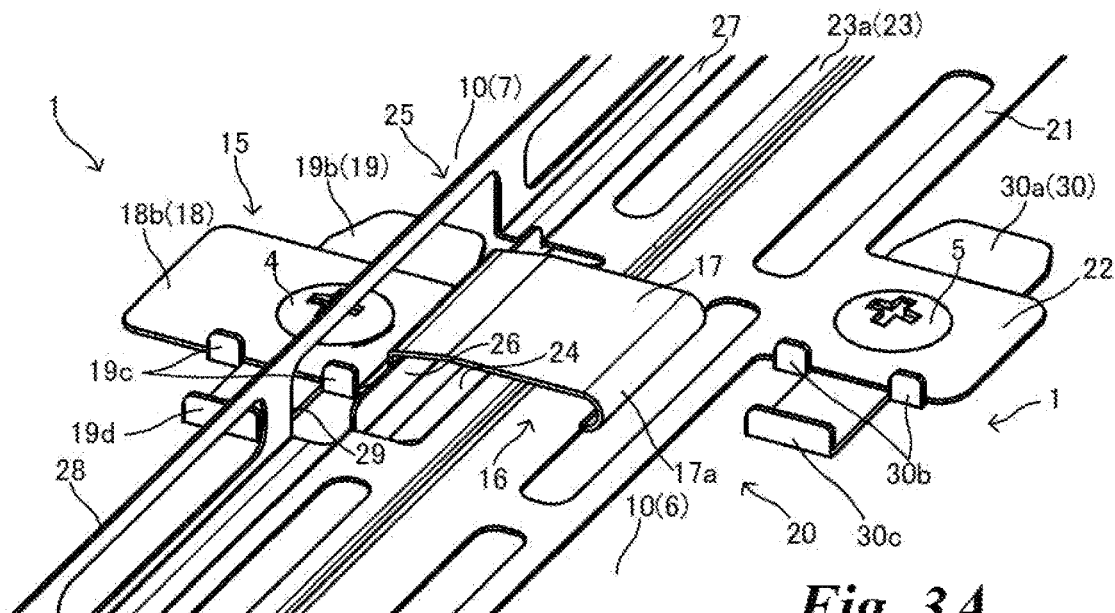
FIG. 3A is a partially broken schematic perspective view corresponding to Z1 in FIG. 2A.
Figure 3B:
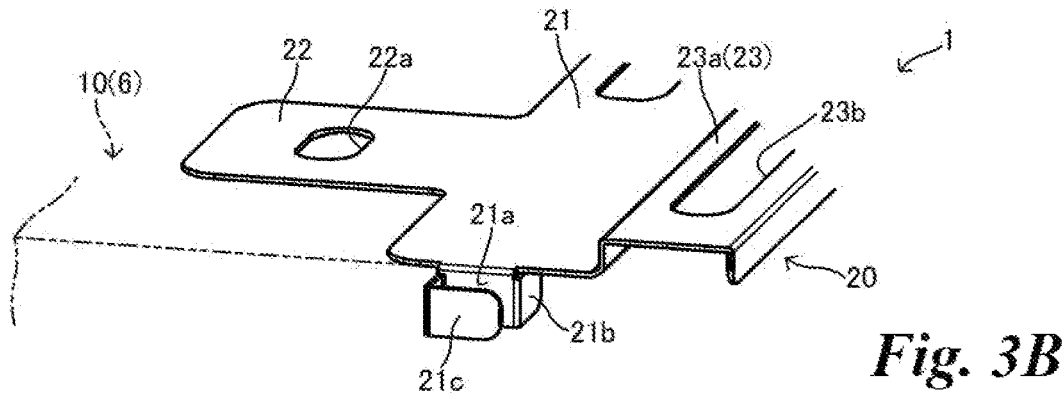
FIG. 3B is a partially broken schematic perspective view corresponding to Z2 in FIG. 1A.

In the embodiment, as illustrated in FIG. 3B, the base member 21 has a first abutting part 21a abutting on the end face of one held end portion 8 of the panel body 10 and a second abutting part 21b abutting on the end face of the first end portion 6. Such a constitution facilitates position adjustment of the attachment position of the reinforcement member 20 to the panel body 10.

The first abutting part 21a and the second abutting part 21b are provided so as to protrude downward from the first end portion of the base member 21 in the longitudinal direction. The figures exemplify that the first abutting part 21a and the second abutting part 21b are provided successively and in orthogonal with each other so as to be disposed along the external corner of the end face of one held end portion 8 and the end face of the first end portion 6. One of or both of the first abutting part 21a and the second abutting part 21b can also be provided for the second end portion of the base member 21 in the longitudinal direction.

In the embodiment, the first end portion of the base member 21 in the longitudinal direction has a third abutting part 21c abutting on the end face of the held end portion 8 of the panel body 10 of the adjacent ceiling panel 1 to be provided in the second direction. The third abutting part 21c is provided so as to protrude from the end face of the held end portion 8 of the panel body 10 so as to form the gap-like joint as mentioned above between the end faces, facing each other in the second direction, of the ceiling panels 1, 1 adjacent to each other in the second direction. Such a constitution easily makes the gap between the ceiling panels 1, 1 equal. The figures exemplify that the third abutting part 21c is successively provided for the first abutting part 21a through a protruding part protruding outward in the second direction from the first abutting part 21a. The lower face of the ceiling base 2 is arranged on the bottom side of the gap formed between the ceiling panels 1, 1 adjacent to each other in the second direction and defines the bottom side of the gap.

The attachment portion 22 is successively provided so as to extend inward in the first direction from the inner side portion of the base portion 21 in the first direction and is in the shape of a piece of which thickness is the same as that of the base portion 21. In the embodiment, a plurality of attachment portions 22, 22, 22 (three in the figures) are provided so as to be spaced in the longitudinal direction of the base portion 21. The attachment portions 22, 22 are provided in the vicinity of the held end portions 8, 8 on both sides of the panel body 10 in the second direction, respectively. Another attachment portion 22 is provided at almost equal intervals between the attachment portions 22, 22 on both sides in the second direction.

Figure 3C:
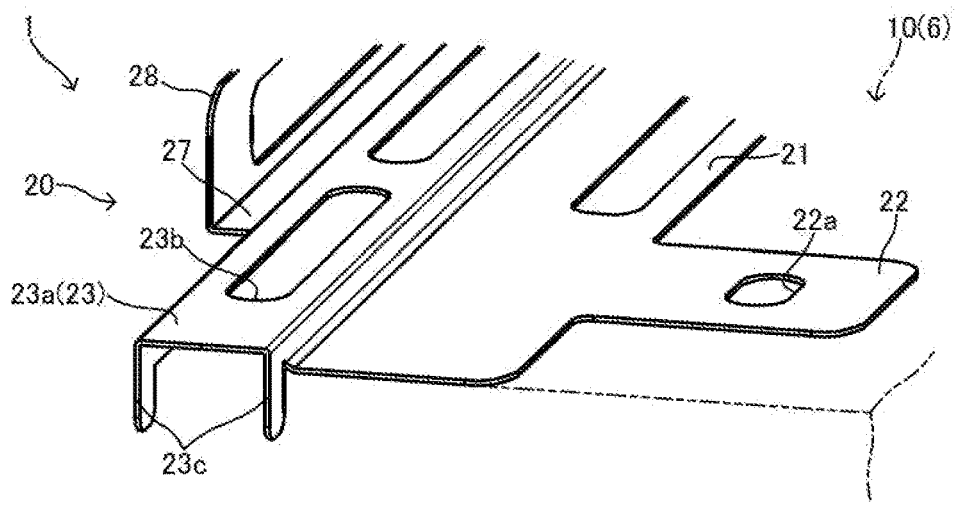
FIG. 3C is a partially broken schematic perspective view corresponding to Z3 in FIG. 1A.

As illustrated in FIG. 3B and FIG. 3C, the attachment portions 22, 22, 22 are provided with an insertion through hole 22a to be inserted by the shaft portion of a fastener 5, referring to FIG. 3A, to be fixed to the panel body 10. As illustrated in FIG. 3A, an insertion part 30 like the one mentioned above is provided for the attachment portions 22, 22, 22 on the inner layer side of the panel body 10. The insertion part 30 is provided with a fastening hole like the one mentioned above, which is omitted in the figures. The insertion part 30 has a tip end portion 30a in the insertion direction and raised parts 30b, 30b, 30c like the above-mentioned embodiment. The embodiment of fixing the reinforcement member 20 to the panel body 10 is not limited to such a constitution and various variations are possible.

The securing part 23 is provided for the panel body 10 along the second direction almost entirely and is in the shape of a plate of which thickness direction is along that of the panel body 10 as illustrated in FIG. 1. The securing part 23 is provided for the base portion 21 successively through a raised part provided so as to rise upward from the outer end portion of the base portion 21 in the first direction. The rising dimension of the raised part is suitably set in such a manner that the abutting face 23a on the upward side of the securing part 23 is on the same plane as the abutting face 9a of the magnet 9 as mentioned above The rising dimension of the raised part is suitably set in such a manner that the dimension along the thickness direction of the panel from the downward face of the securing part 23 to the back face 10a of the panel body 10 is equal to or larger than the dimension of the head portion 3a of the fastener 3 along the axial direction.

The width dimension along the first direction and the thickness dimension of the securing part 23 can be suitably set in view of strength and weight reduction. The figures exemplify that the securing part 23 is provided with a plurality of long holes of which diameters are long in the second direction at intervals in the second direction like the base portion 21. As illustrated in FIG. 3B and FIG. 3C, insertion through holes 23b, 23b to be inserted by the shaft portion of the fastener 3 to be fastened to the ceiling bases 2, 2 are provided for both end portions of the securing part 23 in the longitudinal direction. The insertion through holes 23b, 23b are long holes of which diameters are long in the second direction.

In the embodiment, an abutting part 23c is provided for the second end portion of the securing part 23 in the longitudinal direction as illustrated in FIG. 3C, the abutting part 23c abutting on the end face of the held end portion 8 of the ceiling panel 1 and facing in the second direction of the second end portion of the securing part 23 in the longitudinal direction. Such a constitution easily makes the gap between the ceiling panels 1, 1 equal. The figures exemplify that the second end portion in the longitudinal direction of the securing part 23 protrudes outward in the second direction and the abutting parts 23c, 23c are provided in a pair so as to hang downward from both end portions of the protruding portion in the first direction.

Figure 6A:
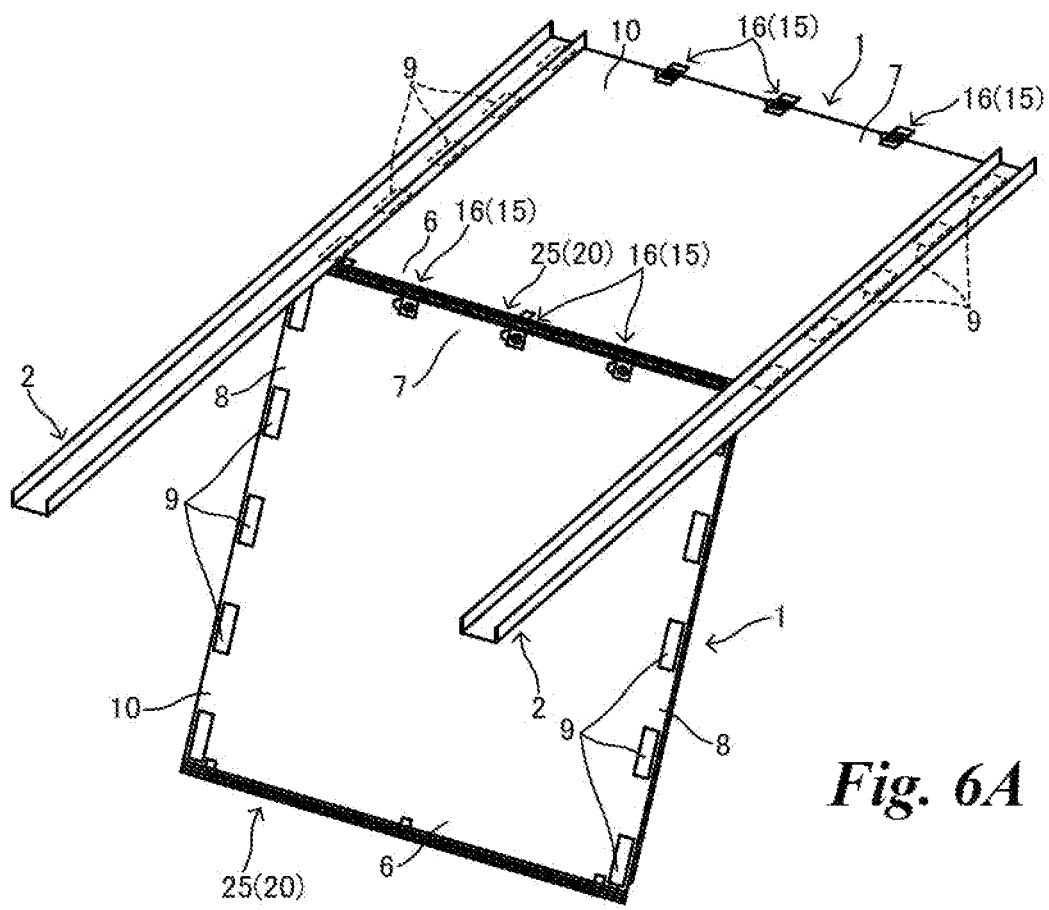
FIG. 6A is a schematic perspective view diagrammatically illustrating one example of a construction procedure of the ceiling panel, and FIG. 6B diagrammatically illustrates one example of the construction procedure and is a partially broken schematic longitudinal sectional view corresponding to FIG. 2B.
Figure 6B:
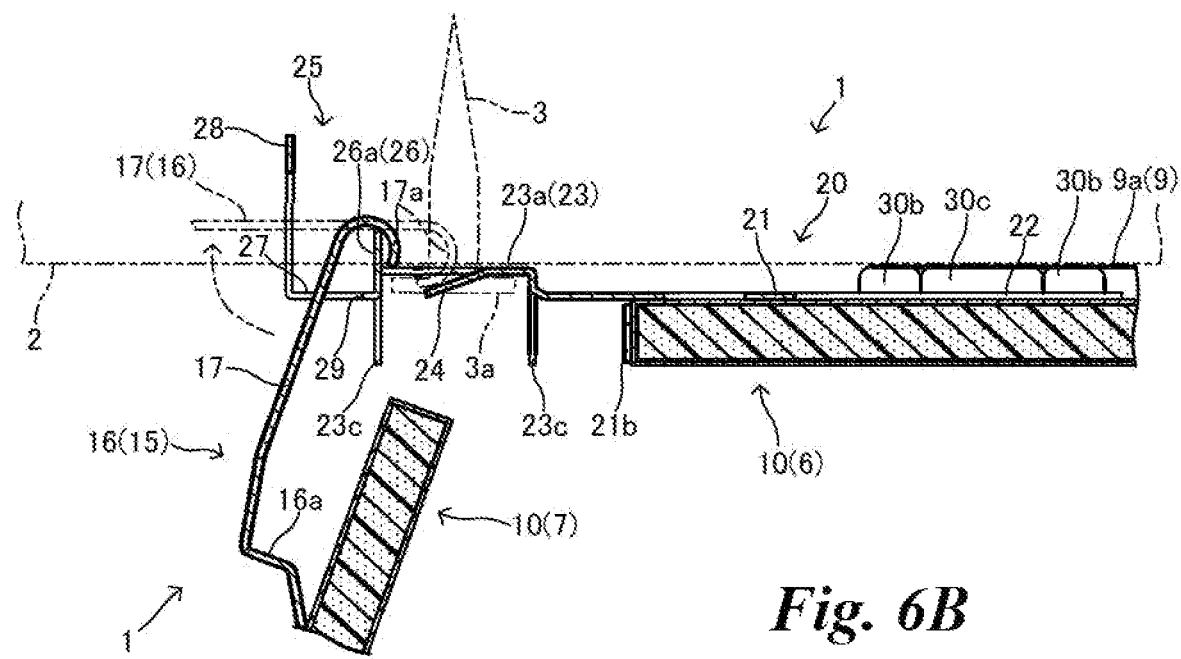

As illustrated in FIG. 1B and FIG. 6B, the hooked portion 25 is provided on the outside of the securing part 23 in the first direction.

In the embodiment, the hooked portion 25 is in the shape of a plate of which thickness direction is along the first direction and has a hooked part 26 on which the folded part 17a of the hooking portion 16 is hooked. The hooked portion 25 is positioned outside in the first direction further than the hooked part 26, is also provided in parallel with the hooked part 26, and has a drop-out prevention part 28 provided with an insertion through hole 29 to be inserted by the folded part 17a. In such a constitution, the folded part 17a comes to be inserted into the insertion through hole 29 of the drop-out prevention part 28 while being hooked and held on the hooked part 26. Thus, when impact is applied from below to the unconstructed ceiling panel 1 with the folded part 17a being held on the hooked portion 25 of the constructed ceiling panel 1 as mentioned above, a hooked and held condition is hardly released and unintentional drop-out of the unconstructed ceiling panel 1 is restrained.

The hooked part 26 is provided so as to protrude upward from the outer end portion of the securing part 23 in the first direction. The face of the hooked part 26 on the outside in the first direction constitutes the abutted face 26*a* to be abutted on the abutting face 16*a* of the hooking portion 16.

The dimension of the hooked part 26 along the second direction is larger than that of the hooking portion 16 along the second direction. The protruding dimension of the hooked part 26 is suitably set so as to keep the folded part 17*a* of the hooking portion 16 hooked. In the embodiment, the hooked part 26 is provided so as to be cut in and raised from the securing part 23 as illustrated in FIG. 3A. The hooked part 26 is provided at a plurality of positions (three in the figures) spaced in the second direction along the first end portion 6 of the panel body 10 so as to be positioned corresponding to the hooking portion 16.

In the embodiment, as illustrated in FIG. 6B, the securing part 23 has an inclined guide part 24 constituting a guide of the folded part 17*a*. When the ceiling panel 1 held by the hooked part 26 is moved to a close side in the first direction relative to the ceiling panel 1 provided with the inclined guide part 24, the inclined guide part 24 functions as a guide of the folded part 17*a* which moves in the same direction. The inclined guide part 24 is provided so as to be cut in and raised downward, which is opposite side to the hooked part 26, from the middle region of the securing part 23 in the first direction. The inclined guide part 24 is gradually inclined in the shape of a downward slope outward in the first direction. In such a constitution, when the hooked part 26 is provided in a cut-in and raised manner, the folded part 17*a* is hardly hooked on the edge of the hole of the securing part 23, and the folded part 17*a* is smoothly guided inward in the first direction along the inclined guide part 24. The inclined guide part 24 is positioned corresponding to the hooked part 26. Namely, the inclined guide part 24 is provided at a plurality of positions (three in the figures) spaced in the second direction along the first end portion 6 of the panel body 10.

The drop-out prevention part 28 is provided so as to rise upward from the tip end portion of an extension part 27 extending outward in the first direction from the lower end portion of a hang-down part hanging downward from the outer end portion of the securing part 23 in the first direction. The hang-down part, the extension part 27, and the drop-out prevention part 28 are provided along the panel body 10 in the second direction almost entirely. Such a constitution improves stiffness of the reinforcement member 20 while achieving reduction of thickness and weight of the reinforcement member 20. The figures exemplify that the hang-down part, the extension part 27, and the drop-out prevention part 28 are not provided on both end portions in the longitudinal direction of the securing part 23 provided entirely along the second direction of the panel body 10, referring to FIG. 1A.

The extension part 27 is in the shape of a plate of which thickness dimension is along the thickness dimension of the panel body 10. The width dimension of the extension part 27 along the first direction can be suitably set so as to be easily inserted by the folded part 17*a* through the insertion through hole 29, to be mentioned below, and in view of weight reduction. The extension part 27 is provided so as not to interfere with the panel body 10 of the adjacent ceiling panel 1 to be provided in the first direction. The figures exemplify that the downward face of the extension part 27 is approximately on the same plane as the back face 10*a* of the panel body 10. Namely, the downward face of the extension part 27 is approximately on the same plane as the face of the base portion 21 on the panel body 10 side.

The dimension of the drop-out prevention part 28 from the securing part 23 along the vertical direction is set to be larger than the protruding dimension of the hooked part 26 in such a manner that the upper end of the drop-out prevention part 28 is positioned upward further than the upper end of the hooked part 26. The figures exemplify that the drop-out prevention part 28 is provided with a plurality of long holes spaced in the second direction like the base portion 21 and the securing part 23, the diameter of the long hole being long in the second direction, referring to FIG. 3A. In such a constitution, when a base is provided at the middle region of the ceiling panel 1 in the second direction for attaching equipment or for reinforcement, the region of the drop-out prevention part 28 interfering with the base is easily excised.

Figure 5A:
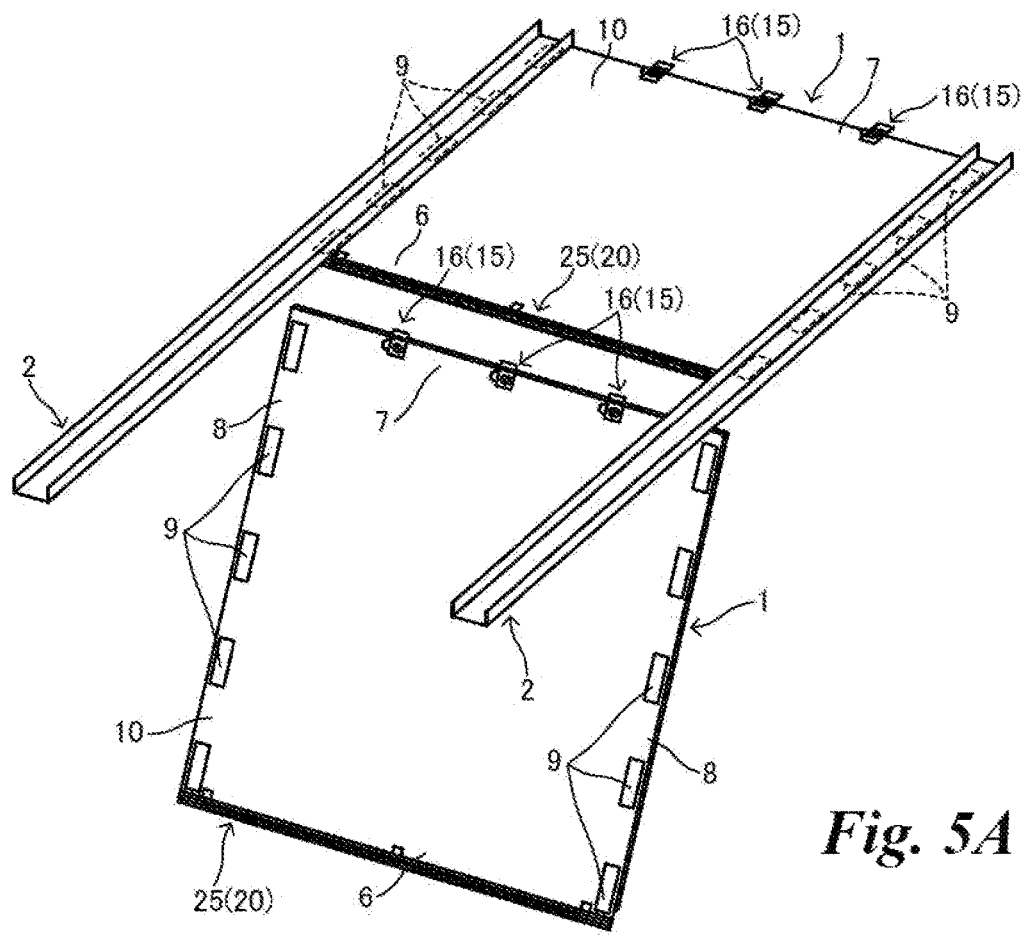
FIG. 5A is a schematic perspective view diagrammatically illustrating one example of a construction procedure of the ceiling panel, and FIG. 5B diagrammatically illustrates one example of the construction procedure and is a partially broken schematic longitudinal sectional view corresponding to FIG. 2B.
Figure 5B:
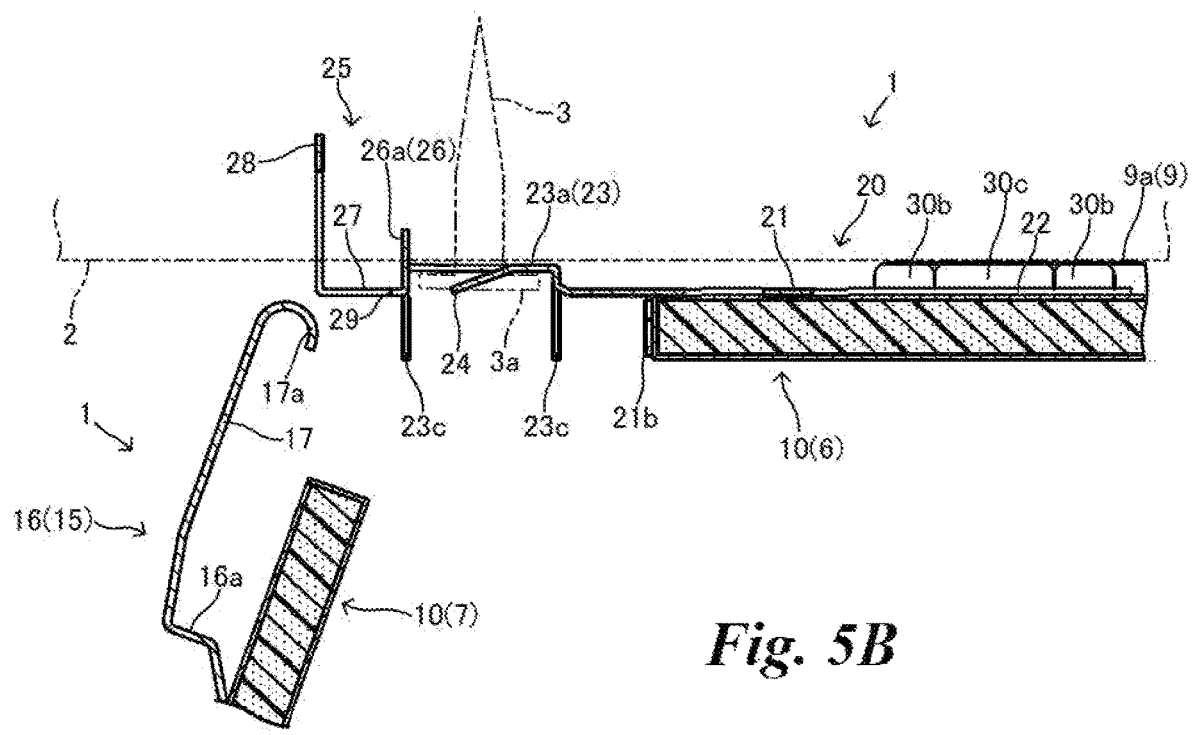

The insertion through hole 29 is provided over the drop-out prevention part 28 and the extension part 27 as illustrated in FIG. 3A and FIG. 5B. Namely, the insertion through hole 29 is successively provided so as to penetrate the outside region of the extension part 27 in the first direction and the downward region of the drop-out prevention part 28. The insertion through hole 29 is provided at a plurality of positions (three in the figures) spaced in the second direction along the first end portion 6 of the panel body 10 so as to be positioned corresponding to the hooked portion 26.

The dimension of the insertion through hole 29 along the second direction is larger than the dimension of the extension portion 17 and the folded portion 17*a* of the hooking portion 16 along the second direction.

The dimension of the insertion through hole 29 along the vertical direction can be suitably set in such a manner that the insertion through hole 29 hardly interferes with the hooking portion 16 of the adjacent ceiling panel 1 to be provided in the first direction. The figures exemplify that the insertion through hole 29 is provided in such a manner that the upper end open edge portion of the insertion through hole 29 on the downward side is positioned upward further than the upper face of the hooking portion 16.

The dimension of the insertion through hole 29 along the first direction can be suitably set in view of the insertion performance of the folded part 17*a*. The figures exemplify that the insertion through hole 29 is provided along the extension part 27 in the first direction almost entirely. The drop-out prevention part 28 and the insertion through hole 29 are not always necessary.

The reinforcement member 20 as constituted above can be successively formed with a suitable metallic material by a press working or a bending procedure. The reinforcement member 20 is not always required for the first end portion 6 close to the wall of the ceiling panel 1 provided close to the wall.

Next explained is an example of a construction procedure of the ceiling panel 1 as constituted above.

As illustrated in FIG. 5A and FIG. 5B, the constructed ceiling panel 1 is held by the ceiling bases 2, 2 provided with the held end portions 8, 8 on both sides in the second direction with a space in the second direction, and the first end portion 6 is fixed to the ceiling bases 2, 2 by the fastener 3 through the securing part 23. The second end portion 7 of the constructed ceiling panel 1 can be fixed to a suitable base close to the wall or to an object to be fixed by several fixing manners.

The unconstructed ceiling panel 1 held in approximately perpendicular or obliquely with the second end portion 7 being upward is moved from below relative to the first end portion 6 of the ceiling panel 1 constructed as mentioned above. As illustrated in FIG. 6A and FIG. 6B, the hooking portion 16 of the unconstructed ceiling panel 1 is inserted into the insertion through hole 29 of the constructed ceiling panel 1, and the folded part 17a is hooked on the hooked part 26 of the constructed ceiling panel 1. In such a constitution, depending on the height of the ceiling, the second end portion 7 of the unconstructed ceiling panel 1 is held on the first end portion 6 of the constructed ceiling panel 1 without requiring operations at a high place using a stepladder or the like when a person stands on the floor.

As illustrated with two-dotted lines in FIG. 6B, the unconstructed ceiling panel 1 is turned so as to be approximately horizontal around the folded part 17a as a fulcrum so as to raise the first end portion 6 side. Then, the unconstructed ceiling panel 1 is moved so as to be pushed toward the close side in the first direction relative to the constructed ceiling panel 1, and the abutting face 16a of the unconstructed ceiling panel 1 is abutted on the abutted face 26a of the constructed ceiling panel 1, referring to FIG. 2B.

When the constructed ceiling panel 1 is provided in the second direction, the end face of the held end portion 8 on the second end portion 7 side of the unconstructed ceiling panel 1 is abutted on the abutting part 23c of the constructed ceiling panel 1 to be faced. The third abutting part 21c of the first end portion 6 of the unconstructed ceiling panel 1 is abutted on the end face of the held end portion 8 of the constructed ceiling panel 1 to be faced. The magnets 9, 9 of the held end portions 8, 8 on both sides of the unconstructed ceiling panel 1 in the second direction are attracted to the ceiling bases 2, 2. The unconstructed ceiling panel 1 can be positioned in the first direction and the second direction with the magnets 9, 9 of the held end portions 8, 8 attracted to the ceiling bases 2, 2.

The securing part 23 of the first end portion 6 of the unconstructed ceiling panel 1 is fixed to the ceiling bases 2, 2 by the fastener 3. A plurality of ceiling panels 1 can be sequentially constructed so as to be positioned adjacent to each other in lengthwise and breadthwise in the same manner. The above-mentioned construction procedure is only an example and is modified in several ways.

An example of a ceiling panel and an example of an construction procedure of the ceiling panel in the second embodiment are explained referring to FIG. 7 to FIG. 11. In the following embodiment, the difference with the above-mentioned embodiment is mainly explained, the same members have the same reference numbers, and their explanation is omitted or simplified. In addition, the explanation of the similar effects to the above-mentioned embodiment is also omitted or simplified.

Figure 7A:
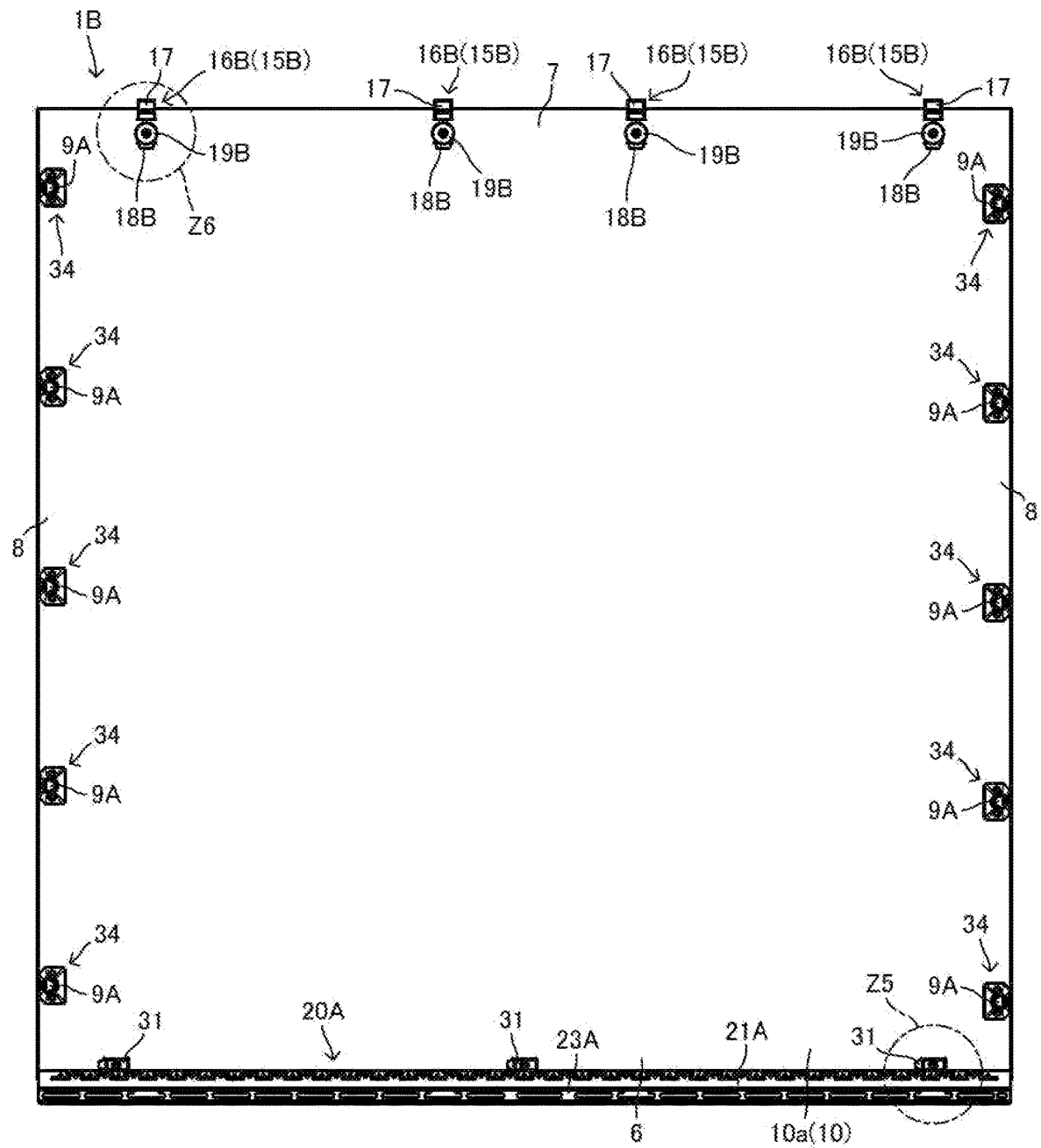
FIG. 7A and FIG. 7B diagrammatically illustrate an example of a ceiling panel according to another embodiment of the present invention.
Figure 7B:
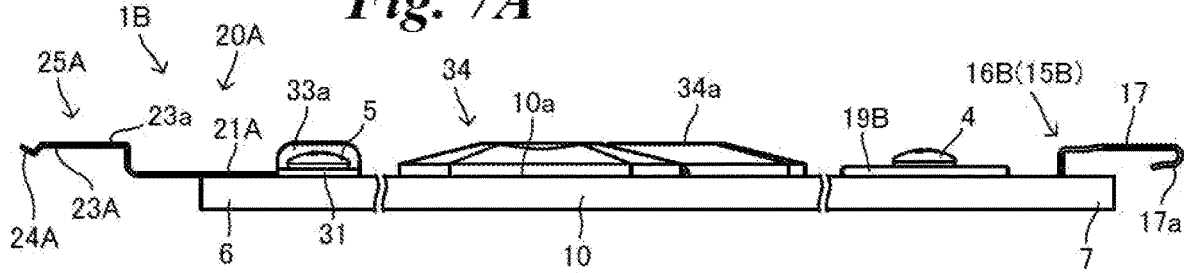
Figure 9A:
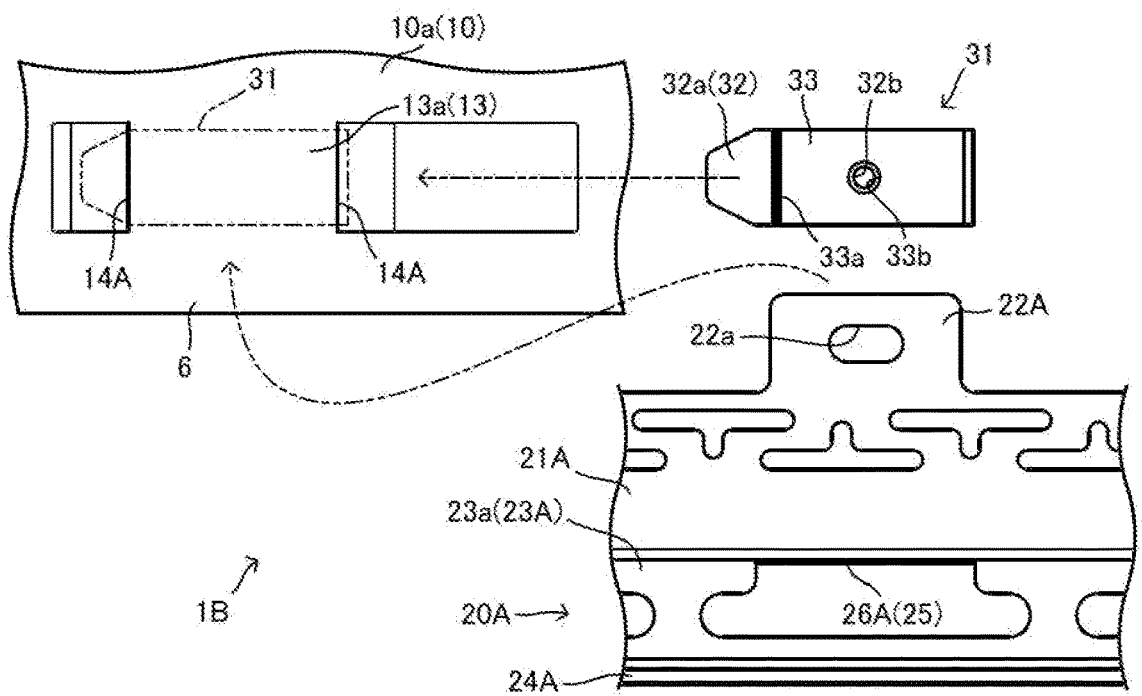
FIG. 9A is a partially broken schematic exploded plan view corresponding to Z5 in FIG. 7A.
Figure 9B:
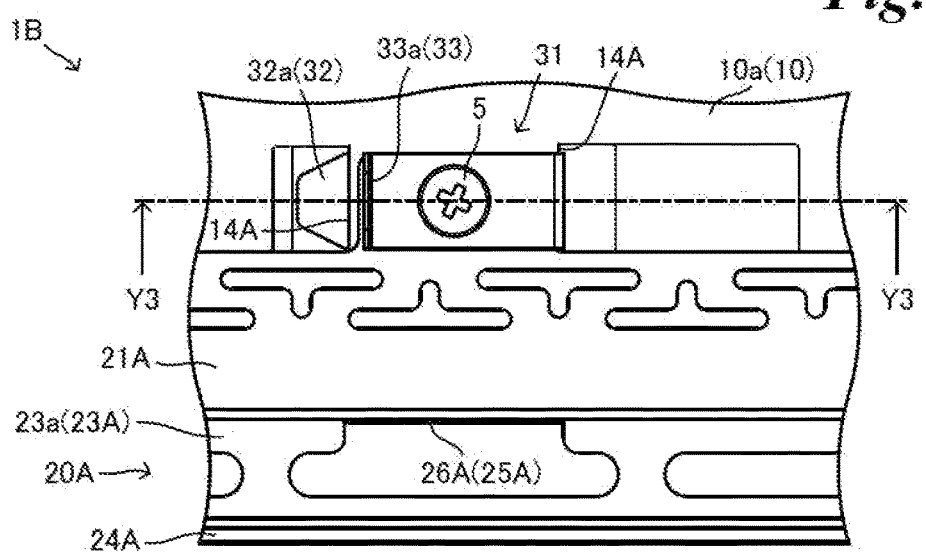
FIG. 9B is a partially broken schematic plan view corresponding to Z5 in FIG. 7A.
Figure 9C:
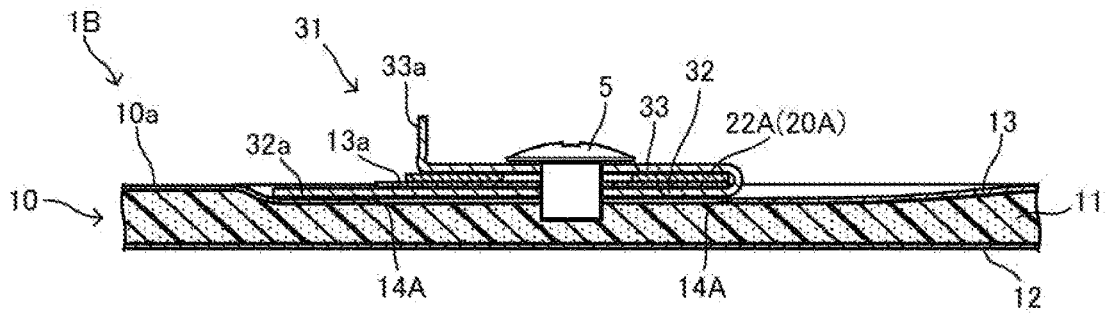
FIG. 9C is a partially broken schematic longitudinal sectional view along a line shown with arrows Y3-Y3 in FIG. 9B.

In a ceiling panel 1B in the embodiment, constitutions of a magnet 9A, a connection member 15B, and a reinforcement member 20A are different from those in the first embodiment. The magnet 9A is provided on the back face 10a side of the panel body 10 through a magnet holding member 34 holding the magnet 9A so as to be housed, as illustrated in FIG. 7A. In such a constitution, when the magnet 9A is relatively apt to be broken, the magnet holding member 34 abuts on the ceiling base 2, so that the magnet 9A is restrained from being damaged by the shock caused by abutment on the ceiling base 2. The magnet 9A to be housed in the magnet holding member 34 can be a neodymium magnet having relatively large magnetic force. The figures exemplify that the magnet 9A is in the shape of a disc of which thickness direction is along the thickness direction of the panel body 10, referring to FIG. 8C. As illustrated in FIG. 7B, an abutting face 34a, to be abutted on the ceiling base 2, of the magnet holding member 34 is on the same plane as the abutting face 23a, to be abutted on the ceiling base 2, of a securing part 23A of the reinforcement member 20A to be mentioned later. The constitution such that the abutting face 34a of the magnet holding member 34 and the abutting face 23a of the securing part 23A are on the same plane is not limited to be a constitution in which they are completely on the same plane as mentioned above, and includes the constitution such that there is a difference of about 2 mm in the thickness direction of the panel.

As illustrated in FIG. 8A to FIG. 8C, the magnet holding member 34 is provided with an adhesive filling portion 36 which penetrates along the thickness direction of the panel body 10 and is provided with an adhesive injection port 37a on the face on the ceiling base 2 side. In such a constitution, the magnet holding member 34 is fixed by an adhesive injected to the adhesive filling portion 36 through the adhesive injection port 37a while being disposed along the back face 10a of the panel body 10.

The magnet holding member 34 is provided with an overflow passage 38 provided with an overflow port 38a on the side circumferential face so as to be communicated with the adhesive filling portion 36. In such a constitution, when an adhesive is injected from the adhesive injection port 37a on the face on the ceiling base 2 side to be filled in the adhesive filling portion 36, the adhesive is overflown from the overflow port 38a. Thus, inadequate adhesive filling is restrained in the adhesive filling portion 36.

The magnet holding member 34 is a resin molding made from a synthetic resin material and is constituted to hold the magnet 9A in such a manner that the magnet 9A does not directly abut on the ceiling base 2. The magnet holding member 34 is provided with a housing recess 35 to house the magnet 9A. The housing recess 35 is constituted to receive the magnet 9A from the face on the panel body 10 side. The housing recess 35 is provided in such a manner that the magnet holding member 34 penetrates along the thickness direction of the panel body 10 and communicates with the adhesive filling portion 36. The figures exemplify that the housing recess 35 is provided around the center of the magnet holding member 34 on a plan view.

The housing recess 35 is defined by an inner circumferential wall face which abuts on or closely faces the side circumferential face of the magnet 9A.

A base side part 35a is provided so as to define the ceiling base 2 side of the housing recess 35. The base side part 35a is provided so as to restrain the magnet 9A from moving toward the ceiling base 2. The figures exemplify that the base side part 35a is provided so as to protrude toward the axial center side of the housing recess 35 from an open circumferential portion on the side of the ceiling base 2 of the housing recess 35. The figures exemplify that a plurality of base side parts 35a (three in the figure) are provided to be spaced in the circumferential direction.

A panel side part 35b is provided so as to define the panel body 10 side of the housing recess 35. The panel side part 35b is provided so as to restrain the magnet 9A from moving toward the panel body 10. The panel side part 35b is provided in the shape of a claw on the tip end portion of a locking part of which tip end side is elastically deformable in the direction to enlarge the diameter of the housing recess 35. The face of the panel side part 35b on the panel body 10 side is an inclined guide face capable of inserting the magnet 9A into the housing recess 35. The figures exemplify that a plurality of locking parts (three in the figures) are provided so as to be spaced in the circumferential direction.

The adhesive filling portion 36 is provided so as to surround the circumference of the locking part and the circumferential wall portion constituting the inner circumferential wall face of the housing recess 35 and to open toward the panel body 10 side. The circumferential wall portion of the magnet holding member 34 is provided so as to define the opening of the panel body 10 side of the adhesive filling portion 36. The adhesive injected to the adhesive filling portion 36 through the adhesive injection port 37*a* can also be filled on the panel body 10 side of the magnet 9A, and the magnet 9A can be refrained from moving relative to the magnet holding member 34.

The adhesive injection port 37*a* opens at the position adjacent to the housing recess 35, i.e., the magnet 9A. In the embodiment, the adhesive injection ports 37*a*, 37*a* are respectively provided so as to open on both sides of the housing recess 35 in the first direction. The adhesive injection ports 37*a*, 37*a* are openings of the adhesive injection passages 37, 37 on the side of the ceiling base 2, the adhesive injection passage 37 being provided so as to penetrate the base side wall portion of the magnet holding member 34 defining the ceiling base 2 side of the adhesive filling portion 36. The adhesive injection passages 37, 37 are provided so as to be positioned on both sides of the housing recess 35 in the first direction.

The overflow passage 38 is provided so as to penetrate the circumferential wall portion of the magnet holding member 34. In the embodiment, the overflow passage 38 is in the shape of a groove opening on the panel body 10 side. Two overflow passages 38, 38 are respectively provided so as to extend to the circumferential wall portion from the adhesive injection passages 37, 37 provided on both sides of the housing recess 35 in the first direction, as mentioned above.

The overflow passage 38, the adhesive injection passages 37, 37 and the adhesive filling portion 36 can be suitably shaped in such a manner that the adhesive injected through the adhesive injection ports 37*a*, 37*a* widely spreads over the adhesive filling portion 36.

The figures exemplify that the held end portion 8 has five magnets 9A spaced in the first direction and the magnet holding members 34 holding the magnets 9A as mentioned above; however, the embodiment is not limited to such an exemplification. The figures also exemplify that the magnet 9A, i.e., the magnet holding member 34, of one held end portion 8 and the magnet 9A, i.e., the magnet holding member 34, of the other held end portion 8 are provided on the same position in the first direction as mentioned above; however, the embodiment is not limited to such an exemplification. For example, when a plurality of ceiling panels 1B are piled up, the magnet 9A of one held end portion 8 and the magnet 9A of the other held end portion 8 vary in position in the first direction in such a manner that the magnets 9A of the ceiling panels 1B are positioned so as not to repel each other. The magnet holding member 34 holding the magnet 9A is not limited to the above-mentioned one and several constitutions can be applied.

The reinforcement member 20A is long in the second direction as mentioned above, and has a base portion 21A disposed along the back face 10*a* of the first end portion 6 of the panel body 10 and an attachment portion 22A provided for the base portion 21A to attach the reinforcement member 20A to the panel body 10. The figures exemplify that the long hole of the base portion 21A is roughly in the shape of a flat letter T seen in the thickness direction and is alternately provided in two lines in such a manner that the vertical lines of the letter T face each other unlike the above-mentioned first embodiment, referring to FIG. 8A and FIG. 9A. In the embodiment, the reinforcement member 20A does not have the first abutting part 21*a*, the second abutting part 21*b*, the third abutting part 21*c*, or the abutting part 23*c*. The attachment portion 22A is provided at a plurality of positions spaced in the longitudinal direction of the base portion 21A as mentioned above. The attachment portion 22A is constituted so as to hold and clamp the clamped layer 13*a* of the panel body 10 between the attachment portion 22A and the insertion part 32. In the embodiment, a holding part 33 is provided so as to hold and clamp the attachment portion 22A between the holding part 33 and the insertion part 32. The fastener 5 through which the holding part 33 and the attachment portion 22A penetrate is constituted to be fastened to the insertion part 32. In such a constitution, the reinforcement member 20A is mechanically fixed to the first end portion 6 as mentioned above. The insertion part 32 and the holding part 33 are integrally provided for a securing member 31.

The insertion part 32 is constituted to be inserted into the layer of the panel body 10 from one of the cut portions 14A, 14A extending in the first direction and a tip end portion 32*a* in the insertion direction is exposed through the other cut portion 14A as mentioned above. The tip end portion 32*a* in the insertion direction of the insertion part 32 is gradually tapered in the thickness direction as mentioned above. The insertion part 32 is provided with a fastening hole 32*b* to which the shaft portion of the fastener 5 is fastened.

The holding part 33 is in the shape of a plate of which thickness direction is along the thickness direction of the panel body 10. The holding part 33 is successively formed at the base end portion in the insertion direction of the insertion part 32 by a bending procedure or the like so as to extend in the insertion direction, or in the second direction, in parallel with the insertion part 32. The figures exemplify that the dimension of the holding part 33 along the first direction is almost the same as that of the insertion part 32 along the same direction and the dimension of the holding part 33 along the second direction is smaller than that of the insertion part 32 along the same direction.

The holding part 33 has a grasping portion 33*a* rising toward the ceiling base 2 side. In the figures, the grasping portion 33*a* is provided at the tip end portion in the insertion direction of the holding part 33.

The holding part 33 is provided with an insertion through hole 33*b* through which the shaft portion of the fastener 5 is inserted so as to be at the same position as the fastening hole 32*b* of the insertion part 32 seen in the thickness direction. The holding part 33 and the insertion part 32 are formed so as to be inserted by the attachment portion 22A and the clamped layer 13*a* therebetween. A recessed portion corresponding to the thickness of the insertion part 32 can be provided on the back face 10*a* side of the panel body 10. Such a recessed portion can be formed by a press working or the like. The fixing constitution of the reinforcement member 20A to the panel body 10 is not limited to those mentioned above and several variations are applied.

The securing part 23A to be fixed to the ceiling base 2 is provided for the almost entire length of the reinforcement member 20A as mentioned above. The securing part 23A is provided so as to extend outward in the first direction from the upper end portion of the raised part rising toward the ceiling base 2 side from the outer end portion of the base portion 21A in the first direction as mentioned above The insertion through holes 23*b*, 23*b* to which the shaft portions of the fasteners 3, 3 fixing the reinforcement member 20A to the ceiling bases 2, 2 on both sides are inserted are provided on both end portions of the securing part 23A in the longitudinal direction, or in the second direction, referring to FIG. 8A. The insertion through holes 23*b*, 23*b* are long holes of which diameters are long in the second direction. The figures exemplify that the securing part 23A is provided with a plurality of long holes of which diameters are long in the second direction, the long holes being spaced in the second direction as mentioned above.

In the embodiment, in place of a constitution in that the tip end side of the securing part 23A in the extending direction has the hang-down part, the extension part 27, and the drop-out prevention part 28, a bent portion 24A which is bent in the shape like a letter V seen in the second direction is provided for almost the entire length of the tip end side of the securing part 23A. Such a constitution improves stiffness of the reinforcement member 20A.

As illustrated in FIG. 11, as mentioned above, the hooked portion 25A is constituted such that a hooking portion 16B of the adjacent ceiling panel 1B is kept to be hooked while the second end portion 7 of the adjacent ceiling panel 1B to be provided in the first direction is positioned upward further than the first end portion 6.

The hooked portion 25A is provided at the outer end portion of the base portion 21A in the first direction in the embodiment. The hooked portion 25A has a hooked part 26A which is in the shape of a plate of which thickness direction is along the first direction and rises toward the ceiling base 2 side from the base portion 21A as mentioned above. In the embodiment, the hooked part 26A is a region of the raised part on the base portion 21A side provided between the base portion 21A and the securing part 23A. An insertion through hole into which the hooking portion 16B is inserted is provided for the end portion of the raised part on the ceiling base 2 side and for a region of the securing part 23A on the raised part side. The figures exemplify that some of the long holes (four in the figures) provided for the securing part 23A are the insertion through holes.

Figure 10A:
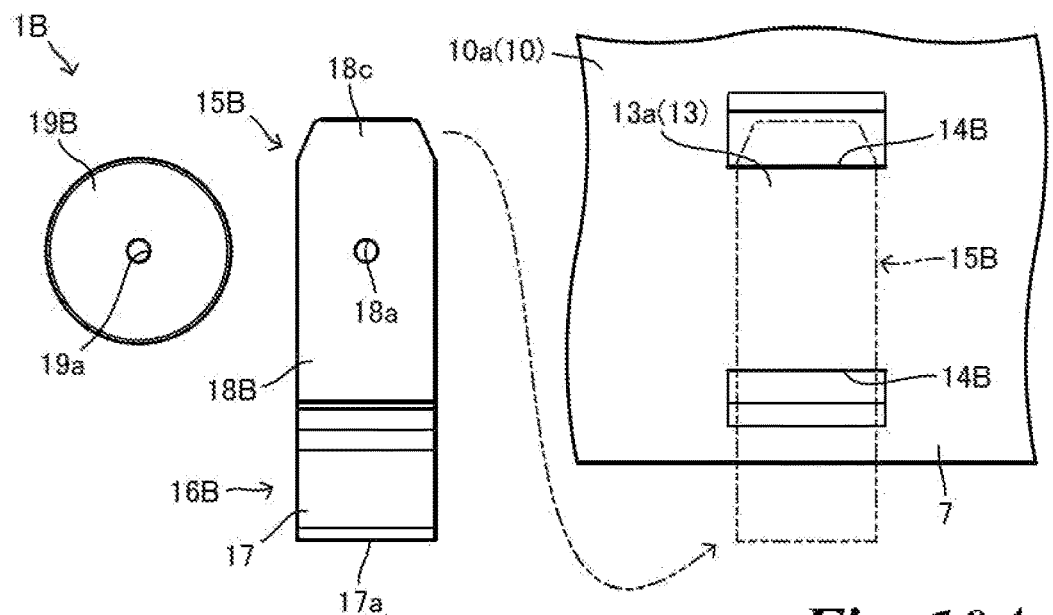
FIG. 10A is a partially broken schematic exploded plan view corresponding to Z6 in FIG. 7A.
Figure 10B:
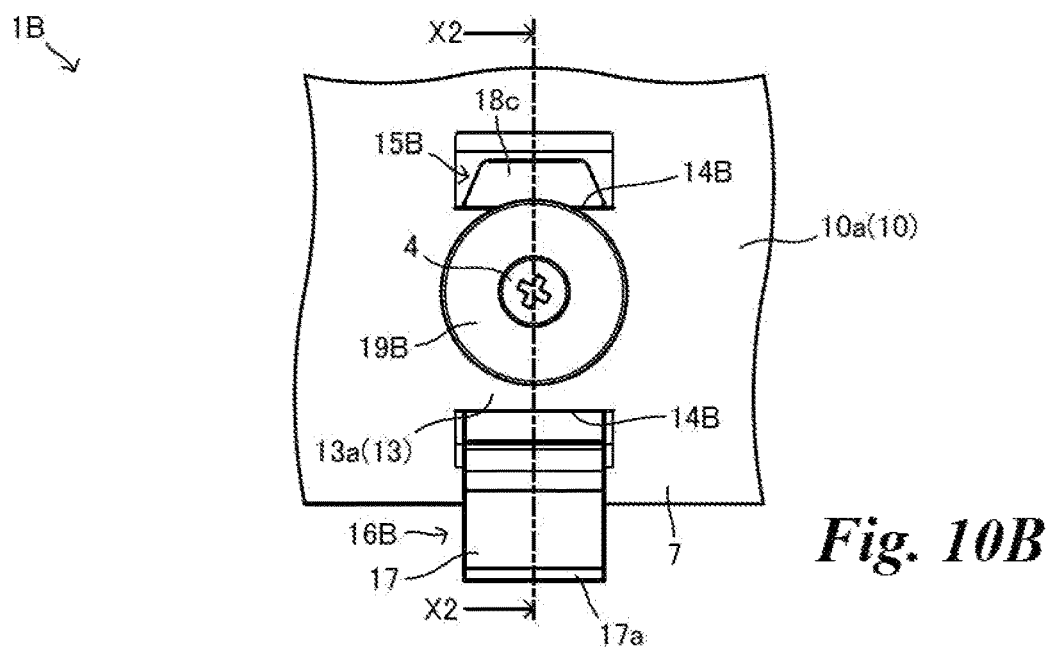
FIG. 10B is a partially broken schematic plan view corresponding to Z6 in FIG. 7A.
Figure 10C:
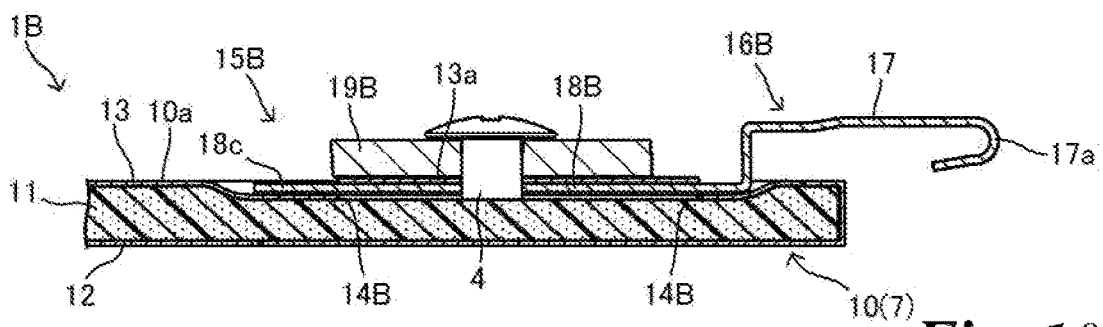
FIG. 10C is a partially broken schematic longitudinal sectional view along a line shown with arrows X2-X2 in FIG. 10B.

As illustrated in FIG. 10, as mentioned above, the hooking portion 16B of a connection member 15B is constituted such that the folded part 17a is provided for the tip end portion of the extension portion 17 extending outward in the first direction from the second end portion 7 of the panel body 10. In the embodiment, an insertion part 18B is integrally provided for the connection member 15B. The insertion part 18B is constituted to be inserted into the layer of the panel body 10 through a cut portion 14B extending in the second direction. The insertion part 18B is provided so as to extend in the first direction and has the hooking portion 16B successively through the raised part on the outer end portion in the first direction. In the embodiment, the raised part of the connection member 15B is, as illustrated in FIG. 11B, constituted so as not to abut on the hooked portion 26A of the adjacent ceiling panel 1B to be provided in the first direction when the ceiling panel 1B is constructed.

A tip end portion 18c in the insertion direction of the insertion part 18B is, as mentioned above, gradually tapered seen in the thickness direction. The insertion part 18B is provided with the fastening hole 18a to be fastened with the shaft portion of the fastener 4. The insertion part 18B is constituted to be inserted into the outer cut portion 14B of the cut portions 14B in the first direction provided with a space in the first direction and the tip end portion 18c in the insertion direction is exposed on the back face 10a side of the panel body 10 through the inner cut portion 14B in the first direction. A recessed portion can be provided on the back face 10a side of the panel body 10 depending on the thickness of the insertion part 18B.

The second end portion 7 has a securing part 19B which is provided along the back face 10a and holds the clamped layer 13a of the panel body 10 between the insertion part 18B and the securing part 19B. The fastener 4 through which the securing part 18 is penetrated is constituted to be fastened to the insertion part 18B. In such a constitution, as mentioned above, with the clamped layer 13a held between the securing part 19B and the insertion part 18B, the connection member 15B, i.e., the hooking portion 16B, is mechanically fixed to the second end portion 7 by the fastener 4 fastened to the insertion part 18B.

The securing part 19B is provided with the insertion through hole 19a through which the shaft portion of the fastener 4 is inserted. The securing part 19B is separately provided from the insertion part 18B in the embodiment. In place of such a constitution, the securing part 19B can be integrally provided with the insertion part 18B. The figures exemplify that the securing part 19B is in the shape of a disc; however, the embodiment is not limited to such an exemplification. The embodiment for fixing the hooking portion 16B to the panel body 10 is not limited to the above-mentioned constitution and several variations are applied. In the embodiment, the hooking portion 16B, i.e., the connection member 15B, is provided for the second end portion 7 at a plurality of positions (four in the figures) with a space in the second direction. The hooked part 26A of the hooked portion 25A of the reinforcement member 20A is positioned corresponding to the hooking portion 16B.

As illustrated in FIG. 11, the ceiling panel 1B as constituted above is constructed as below as mentioned above.

Figure 11A:
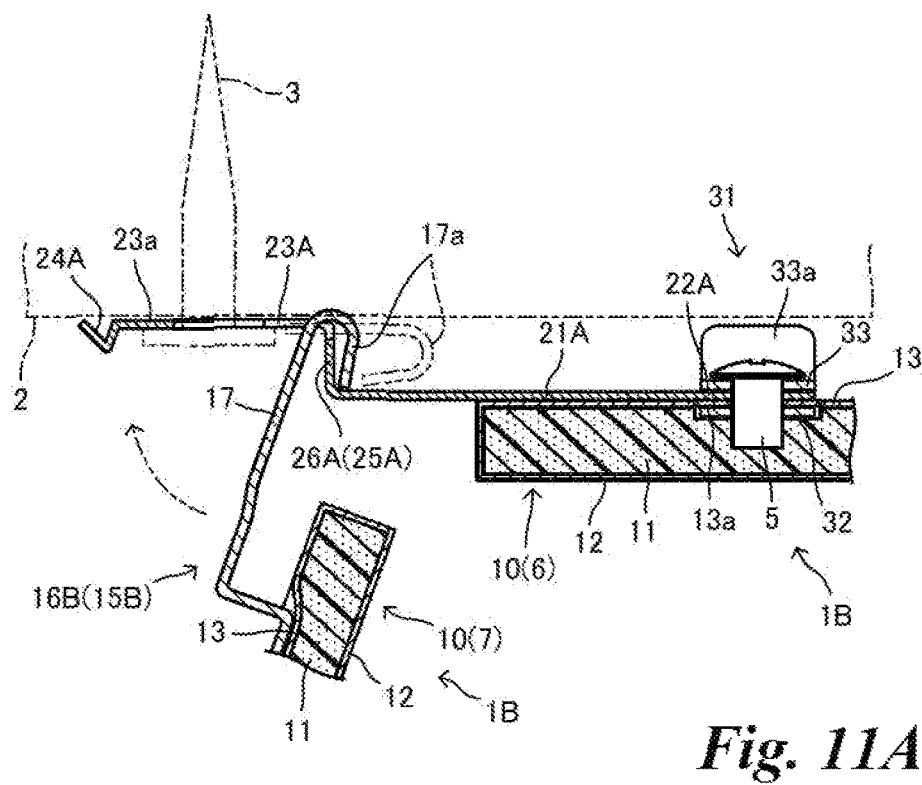
FIG. 11A and FIG. 11B are partially broken schematic longitudinal sectional views corresponding to FIG. 2B.
Figure 11B:
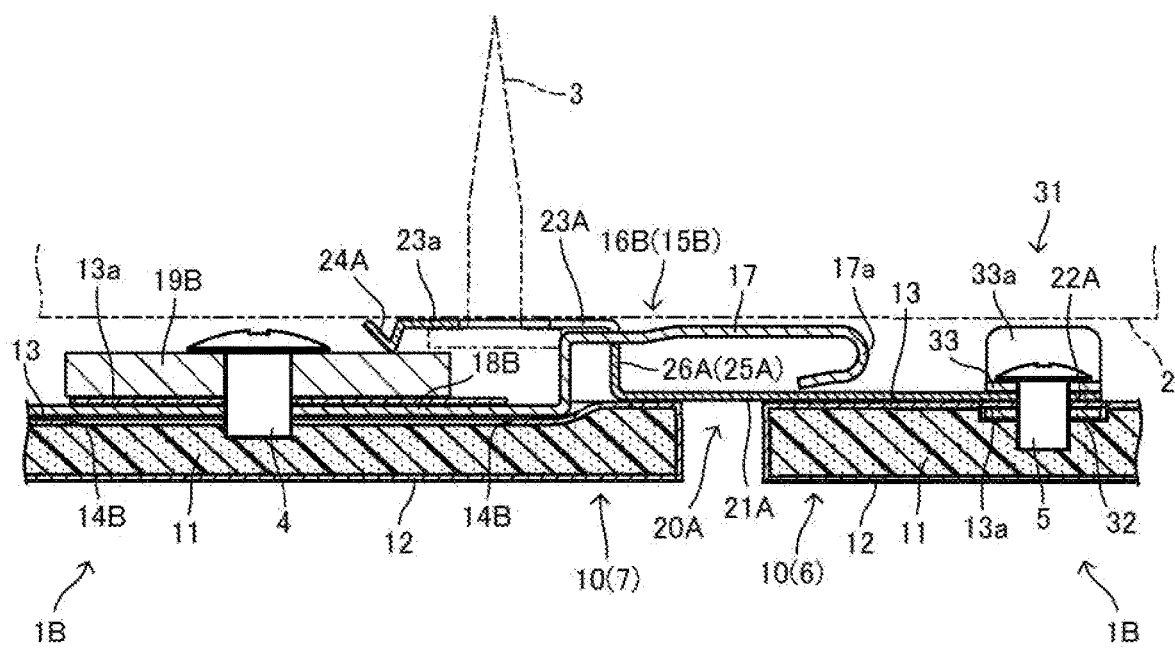

As illustrated in FIG. 11A, the second end portion 7 of the unconstructed panel 1B is positioned upward, and the hooking portion 16B is hooked on the hooked portion 25A of the first end portion 6 of the constructed ceiling panel 1B. As illustrated with two-dotted lines in FIG. 11A, the unconstructed ceiling panel 1B is turned around the folded part 17a as a fulcrum to be almost in horizontal so as to raise the first end portion 6 side, referring to FIG. 11B. In this embodiment, a positioning portion for positioning the end faces of the ceiling panels 1B, 1B adjacent to each other in the first direction is not provided, so that a gap-like joint can be provided through a suitable spacer or the like. The gap can be formed by a suitable spacer or the like between the end faces of the ceiling panels 1B, 1B adjacent to each other in the second direction. The securing part 23A of the first end portion 6 of the unconstructed ceiling panel 1B is fixed to the ceiling bases 2, 2 by the fastener 3. The different constitutions of the ceiling panels 1, 1A, 1B in each embodiment can be exchanged or combined to be actually applied.

Each embodiment as mentioned above exemplifies that a gap-like joint is formed between the ceiling panels 1, 1, 1B, 1B adjacent to each other in the first direction and also between the ceiling panels 1, 1, 1B, 1B adjacent to each other in the second direction; however, the gaps are not always required in one or both of them. Namely, the end faces of the adjacent ceiling panels 1, 1, 1B, 1B can abut to each other. In such a case, the abutting face 16a, the abutted face 26a, the abutting part 23c and the third abutting part 21c, as explained in the first embodiment, can be suitably modified in position, or a constitution without such a positioning portion can be applied.

Each embodiment mentioned above exemplifies that the hooked portions 25, 25A and the securing parts 23, 23A are provided for the reinforcement members 20, 20A which are provided along the first end portion 6 of the panel body 10 in the second direction almost entirely; however, one of or both of the hooked portion and the securing part are not always necessary for the reinforcement members 20, 20A. The reinforcement members 20, 20A are not always required. In such a case, the hooked portions 25, 25A and the securing parts 23, 23A can be respectively provided for the first end portion 6 of the panel body 10.

Each embodiment as mentioned above exemplifies that the held end portions 8, 8 on both sides in the second direction are held on the ceiling bases 2, 2 by the magnets 9, 9, 9A, 9A; however, the held end portions 8, 8 can be fixed to the ceiling bases 2, 2 by a suitable fastener in addition to or in place of the magnets 9, 9, 9A, 9A. In such a case, the above-mentioned securing part 23, 23A are not always required.

Each embodiment as mentioned above exemplifies that the hooked portions 25, 25A have the hooked parts 26, 26A protruding in the thickness direction of the panel body 10; however, the embodiment is not limited to such an exemplification and the hooked portions 25, 25A can be in the shape of a locking hole into which the hooking portions 16, 16B are inserted. The hooked portions 25, 25A to which the hooking portions 16, 16B are hooked can be variously modified.

Each embodiment as mentioned above exemplifies that the hooking portions 16, 16B have the folded part 17a; however, the hooking portions 16, 16B can be in the shape of a letter L or in the shape of an insertion part without having the folded part 17a, and the hooking portions 16, 16B are variously modified. In such a case, the hooked portions 25, 25A can be modified as required. The connection portion and the connected portion respectively provided for the end portions 6, 7 of the panel body 10 in the first direction are not limited to the above-mentioned hooking portions 16, 16B and the hooked portions 25, 25A, and can be in a shape of a projection to be fitted in the horizontal direction, and variously modified. The constitution of the ceiling panels 1, 1A, 1B is not limited to the embodiment mentioned above, and can be variously modified.

REFERENCE SIGNS LIST

1, 1A, 1B ceiling panel
7 second end portion (one end portion in first direction)
10 panel body
10a back face
11 base member
13 reinforcement layer
14, 14B cut portion
15, 15A, 15B connection member
16, 16B hooking portion (connection portion)
18, 18A base end side part (securing part)
18b extension portion
19, 19A, 18B insertion part
19b, 18c tip end portion in insertion direction
19B securing part
25, 25A hooked portion
4 fastener

The invention claimed is:

1. A ceiling panel having a connection portion at one of end portions on both sides in a first direction of a panel body in a shape of a rectangular flat plate, the connection portion connecting with a connected portion of an adjacent ceiling panel,
wherein the connection portion is fixed to the end portion by a fastener, the fastener being fastened to an insertion part inserted into a layer of the panel body from a cut portion opening on a back face of the end portion so as to penetrate a securing part provided along the back face of the end portion.

2. The ceiling panel according to claim 1,
wherein the connection portion is provided for a connection member having a base end side part constituting the securing part, and the cut portion is provided so as to extend in the first direction.

3. The ceiling panel according to claim 2,
wherein the insertion part is bent from one side portion of the base end side part in a second direction orthogonal to the first direction and is integrally provided for the connection member.

4. The ceiling panel according to claim 2,
wherein the base end side part has an extension portion extending inward in the first direction further than the insertion part.

5. The ceiling panel according to claim 1,
wherein the connection portion is provided for a connection member having the insertion part, and the cut portion is provided so as to extend in the second direction orthogonal to the first direction.

6. The ceiling panel according to claim 1,
wherein the cut portion is provided at two positions spaced in parallel, the insertion part is inserted into one cut portion and a tip end portion in an insertion direction of the insertion part is exposed on a back face side of the panel body through the other cut portion.

7. The ceiling panel according to claim 1, wherein the panel body is constructed such that a reinforcement layer is piled upon a back face side of a base member of a resin foam system or a fiber system, and the cut portion is formed by penetrating the reinforcement layer.

8. The ceiling panel according to claim 3,
wherein the base end side part has an extension portion extending inward in the first direction further than the insertion part.

9. The ceiling panel according to claim 2,
wherein the cut portion is provided at two positions spaced in parallel, the insertion part is inserted into one cut portion and a tip end portion in an insertion direction of the insertion part is exposed on a back face side of the panel body through the other cut portion.

10. The ceiling panel according to claim 3,
wherein the cut portion is provided at two positions spaced in parallel, the insertion part is inserted into one cut portion and a tip end portion in an insertion direction of the insertion part is exposed on a back face side of the panel body through the other cut portion.

11. The ceiling panel according to claim 4,
wherein the cut portion is provided at two positions spaced in parallel, the insertion part is inserted into one cut portion and a tip end portion in an insertion direction of the insertion part is exposed on a back face side of the panel body through the other cut portion.

12. The ceiling panel according to claim 2,
wherein the panel body is constructed such that a reinforcement layer is piled upon a back face side of a base member of a resin foam system or a fiber system, and the cut portion is formed by penetrating the reinforcement layer.

13. The ceiling panel according to claim 3,
wherein the panel body constructed such that a reinforcement layer is piled upon a back side of a base member of a resin foam system or a fiber system, and the cut portion is formed by penetrating the reinforcement layer.

14. The ceiling panel according to claim 4,
wherein the panel body is constructed such that a reinforcement layer is piled upon a back face side of a base member of a resin foam system or a fiber system, and the cut portion is formed by penetrating the reinforcement layer.

15. The ceiling panel according to claim 5,
wherein the panel body is constructed such that a reinforcement layer is piled upon a back face side of a base member of a resin foam system or a fiber system, and the cut portion is formed by penetrating the reinforcement layer.

16. The ceiling panel according to claim 6,
wherein the panel body is constructed such that a reinforcement layer is piled upon a back face side of a base member of resin foam system or a fiber system, and the cut portion is formed by penetrating the reinforcement layer.

17. The ceiling panel according to claim 5,
wherein the cut portion is provided at two positions spaced in parallel, the insertion part is inserted into one cut portion and a tip end portion in an insertion direction of the insertion part is exposed on a back face side of the panel body through the other cut portion.

18. The ceiling panel according to claim 8,
wherein the cut portion is provided at two positions spaced in parallel, the insertion part is inserted into one cut portion and a tip end portion in an insertion direction of the insertion part is exposed on a back face side of the panel body through the other cut portion.

19. The ceiling panel according to claim 8,
wherein the panel body is constructed such that a reinforcement layer is piled upon a back face side of a base member of a resin foam system or a fiber system, and the cut portion is formed by penetrating the reinforcement layer.

20. The ceiling panel according to claim 17,
wherein the panel body is constructed such that a reinforcement layer is piled upon a back face side of a base member of a resin foam system or a fiber system, and the cut portion is formed by penetrating the reinforcement layer.

* * * * *